United States Patent
Rafferty et al.

(10) Patent No.: US 11,542,866 B2
(45) Date of Patent: Jan. 3, 2023

(54) ADAPTABLE FLOW CONTROL FOR ENGINE NACELLES

(71) Applicants: The Boeing Company, Chicago, IL (US); Georgia Tech Research Corporation, Atlanta, GA (US)

(72) Inventors: Bradley J. Rafferty, St. Louis, MO (US); Matthew C. DeFore, Huntington Beach, CA (US); Ari Glezer, Atlanta, GA (US); Bojan Vukasinovic, Marietta, GA (US); Derek A. Nichols, Atlanta, GA (US)

(73) Assignee: The Boeing Company, Chicago, IL (US)

( * ) Notice: Subject to any disclaimer, the term of this patent is extended or adjusted under 35 U.S.C. 154(b) by 108 days.

(21) Appl. No.: 15/931,328

(22) Filed: May 13, 2020

(65) Prior Publication Data

US 2021/0355874 A1    Nov. 18, 2021

(51) Int. Cl.
| | |
|---|---|
| *F02C 7/057* | (2006.01) |
| *F02C 7/042* | (2006.01) |
| *B64D 33/02* | (2006.01) |
| *F01D 17/12* | (2006.01) |
| *F02C 6/08* | (2006.01) |

(52) U.S. Cl.
CPC .............. *F02C 7/057* (2013.01); *B64D 33/02* (2013.01); *F01D 17/12* (2013.01); *F02C 6/08* (2013.01); *F02C 7/042* (2013.01); *B64D 2033/0226* (2013.01); *F05D 2260/60* (2013.01); *F05D 2270/10* (2013.01); *F05D 2270/17* (2013.01)

(58) Field of Classification Search
CPC ...... F02C 6/06; F02C 6/08; F02C 7/04; F02C 7/042; F02C 7/057; B64D 33/02; B64D 2033/0226; B64C 21/04; B64C 21/06
USPC ........................................................ 137/15.2
See application file for complete search history.

(56) References Cited

U.S. PATENT DOCUMENTS

| | | | | |
|---|---|---|---|---|
| 4,154,256 A | * | 5/1979 | Miller .................... | B64D 33/02 137/15.1 |
| 5,448,881 A | * | 9/1995 | Patterson ................ | F04D 27/02 701/100 |
| 6,682,021 B1 | * | 1/2004 | Truax ...................... | F01D 17/08 244/203 |
| 7,637,455 B2 | * | 12/2009 | Silkey .................... | B64D 33/02 244/53 B |
| 7,766,280 B2 | * | 8/2010 | Cloft ..................... | B64D 33/02 244/209 |

(Continued)

OTHER PUBLICATIONS

Burley, Richard R. and Hwang, Danny P.; "Investigation of Tangential Blowing Applied to a Subsonic V/STOL Inlet"; Journal of Aircraft, vol. 20, No. 11, Nov. 1983.

*Primary Examiner* — Alain Chau
(74) *Attorney, Agent, or Firm* — Felix L. Fischer

(57) ABSTRACT

An inlet flow distortion control system employs a plurality of flow control devices forming at least one array integrated into an internal surface of the inlet. The at least one array extends over an azimuthal range relative to a normal flow axis of the inlet and has a plurality of circumferential rows spaced at increasing distance from a highlight of the inlet. A control system is operably connected to the flow control devices and adapted to activate flow control devices in selected subarrays of the array responsive to a predetermined flight condition.

20 Claims, 26 Drawing Sheets

(56) References Cited

U.S. PATENT DOCUMENTS

| | | | | |
|---|---|---|---|---|
| 7,975,961 B2* | 7/2011 | Silkey | | F01D 5/145 |
| | | | | 244/53 B |
| 8,192,147 B2* | 6/2012 | Haas | | B64D 33/02 |
| | | | | 415/144 |
| 8,282,037 B2* | 10/2012 | Jain | | B64D 33/02 |
| | | | | 244/53 B |
| 8,459,597 B2* | 6/2013 | Cloft | | F02K 3/06 |
| | | | | 244/208 |
| 9,334,807 B2* | 5/2016 | deGaribody | | G01S 17/02 |
| 9,932,121 B2* | 4/2018 | Morford | | F02C 7/04 |
| 10,131,443 B2* | 11/2018 | Namgoong | | F02C 7/045 |
| 10,161,773 B2* | 12/2018 | deGaribody | | F02C 7/04 |
| 10,605,113 B2 | 3/2020 | Shmilovich et al. | | |
| 2007/0241229 A1* | 10/2007 | Silkey | | F01D 5/145 |
| | | | | 244/53 A |
| 2008/0296439 A1* | 12/2008 | Cloft | | F02C 6/08 |
| | | | | 244/208 |
| 2009/0121083 A1* | 5/2009 | Jain | | B64D 29/00 |
| | | | | 137/142 |
| 2012/0325978 A1 | 12/2012 | Jain | | |
| 2013/0343864 A1* | 12/2013 | Morford | | F02C 7/04 |
| | | | | 415/1 |
| 2015/0027545 A1* | 1/2015 | Baruzzini | | F02C 7/04 |
| | | | | 137/15.1 |
| 2015/0030446 A1* | 1/2015 | Gonidec | | F02K 1/30 |
| | | | | 137/15.1 |
| 2015/0330310 A1* | 11/2015 | deGaribody | | G01S 17/58 |
| | | | | 702/45 |
| 2016/0053683 A1* | 2/2016 | Labrecque | | F02C 7/045 |
| | | | | 137/15.2 |
| 2017/0001730 A1* | 1/2017 | Namgoong | | B64D 33/02 |
| 2017/0158341 A1* | 6/2017 | Kawai | | B64D 33/02 |
| 2018/0010518 A1 | 1/2018 | Ortmanns | | |
| 2018/0363491 A1* | 12/2018 | Shmilovich | | F01D 25/24 |
| 2019/0112978 A1* | 4/2019 | di Mare | | F02C 7/05 |
| 2021/0332764 A1* | 10/2021 | Saripella | | F02C 7/04 |

* cited by examiner

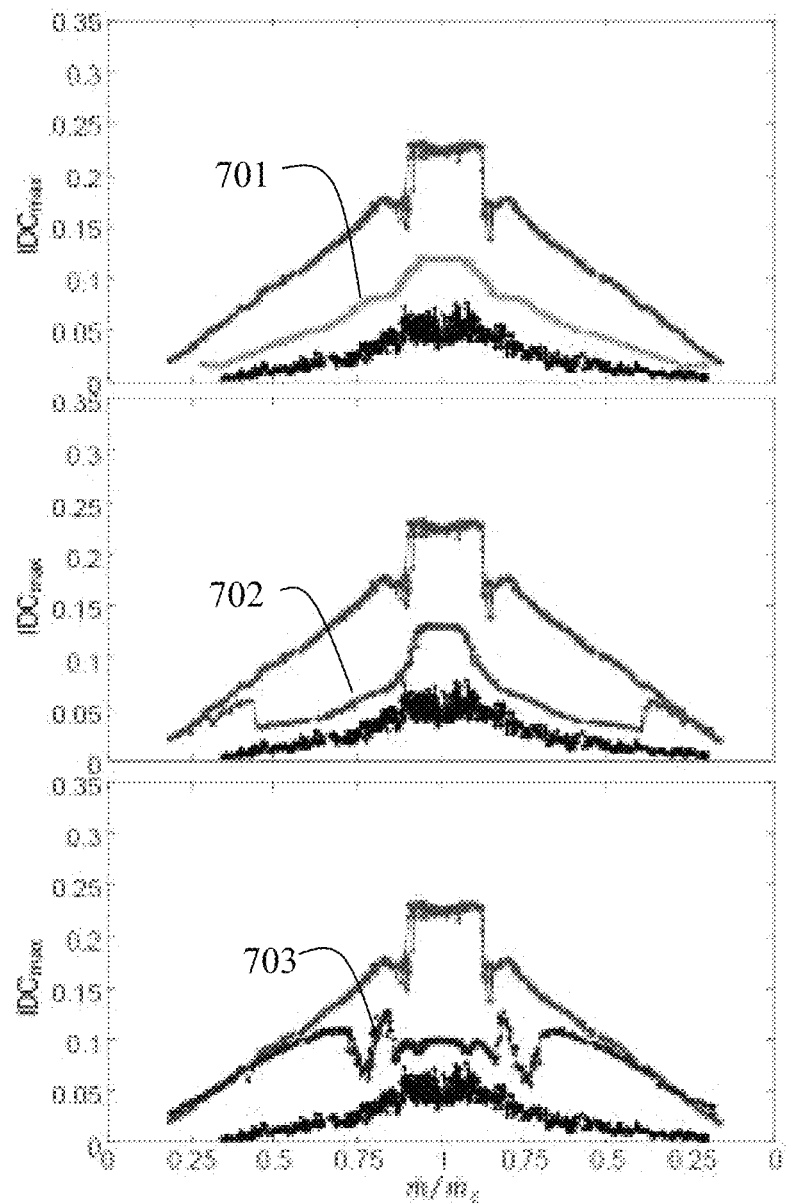

ADAPTABLE FLOW CONTROL FOR ENGINE NACELLES

BACKGROUND INFORMATION

Field

This disclosure relates generally to the field of aircraft fan jet propulsion employing inlets with a low ratio of inlet length to engine fan diameter (L/D) and, more particularly, to an inlet flow control system employing arrays of flow control devices on internal surfaces of a fan inlet for mitigating flow distortion in the inlet in low speed operations due to crosswind, high angle-of-attack, and ground vortices.

Background

Modern commercial aircraft predominantly employ fan jet engines. Current inlets are designed with high inlet length to engine fan diameter (L/D) values. Greater than 0.5 L/D is typical for current engines to maintain desired flow profiles at the fan face in crosswinds and other flight conditions. Future inlets are expected to employ an L/D lower than 0.5. A lower limit on L/D appears to exist with current inlet design capabilities based on inlet lengths required to mitigate flow distortion in the inlet in low-speed takeoff and landing conditions. However, an L/D smaller than the current lower limit would aerodynamically improve all other segments of the mission (97% of the mission profile for a 1 hour commercial flight profile). This aerodynamic performance improvement due to a lower L/D reduces the fuel consumption by the aircraft. Current inlets are designed to meet the aforementioned low-speed takeoff and landing requirements (approximately two minutes of a typical commercial aircraft flight) and thus are overdesigned for the climb/cruise/descent flight phases. This 'overdesign' causes a fuel burn penalty throughout the rest of the mission due to increased drag and weight.

Current solutions for flow control applied to aircraft inlets provide non-modular designs with fixed flow control device configurations. Any given flow control input may become much less effective (or may be ineffective) due to the fact that the separated flow region is dynamic and may move within the inlet. Consequently, existing flow control solutions could be 'missing' the separated region. Such system configurations require that, in order to continue to successfully combat flow separation throughout different flight conditions, the flow control system output be increased and therefore the input is increased (e.g., higher input mass flow rate for a pneumatic flow control system). Consequently, such systems may affect size, weight, and power requirements.

SUMMARY

Exemplary implementations of an inlet flow distortion control system employ a plurality of flow control devices forming at least one array integrated into an internal surface of the inlet. The at least one array extends over an azimuthal range relative to a normal flow axis of the inlet and has a plurality of circumferential rows spaced at increasing distance from a highlight of the inlet. A control system is operably connected to the flow control devices and adapted to activate flow control devices in selected subarrays of the array responsive to a predetermined flight condition.

The exemplary implementations provide a method for flow control in a low L/D fan jet inlet. A status signal and mass flow signal are received in a controller. A control output from the controller is issued responsive to the status and mass flow signals to one or more of a plurality of flow control devices in an array on an inlet internal surface and flow distortion in the inlet is reduced.

BRIEF DESCRIPTION OF THE DRAWINGS

The features, functions, and advantages that have been discussed can be achieved independently in various implementations or may be combined in yet other implementations further details of which can be seen with reference to the following description and drawings.

FIGS. 7A-7C are graphs of the maximum inlet distortion coefficient corresponding to the subarray activations in FIGS. 6A-6C;

DETAILED DESCRIPTION

The implementations described herein provide one or more azimuthal-radial arrays of flow control devices integrated into the internal surface of an inlet. The total azimuthal-radial coverage of the flow control array is determined based on the flow separation domain over the full flight envelope and subsets or controlled configuration of the arrays can be activated at particular realized flow states.

Figure 1:
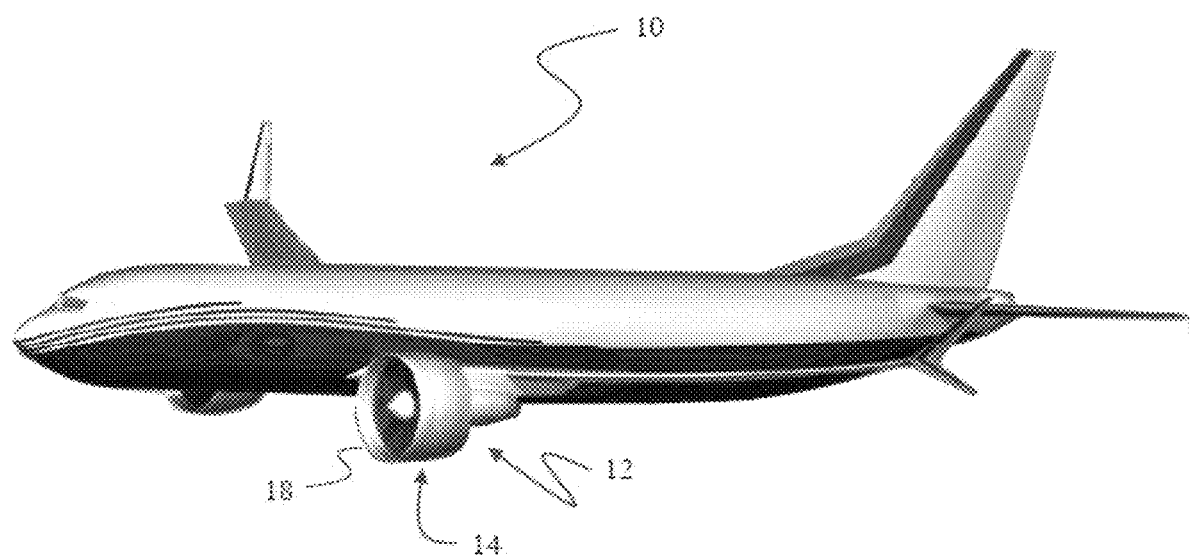
FIG. 1 is pictorial representation of a commercial aircraft with high bypass ratio turbofan engines in which example implementations of the adaptable flow control for engine nacelles are employed.
Figure 2:
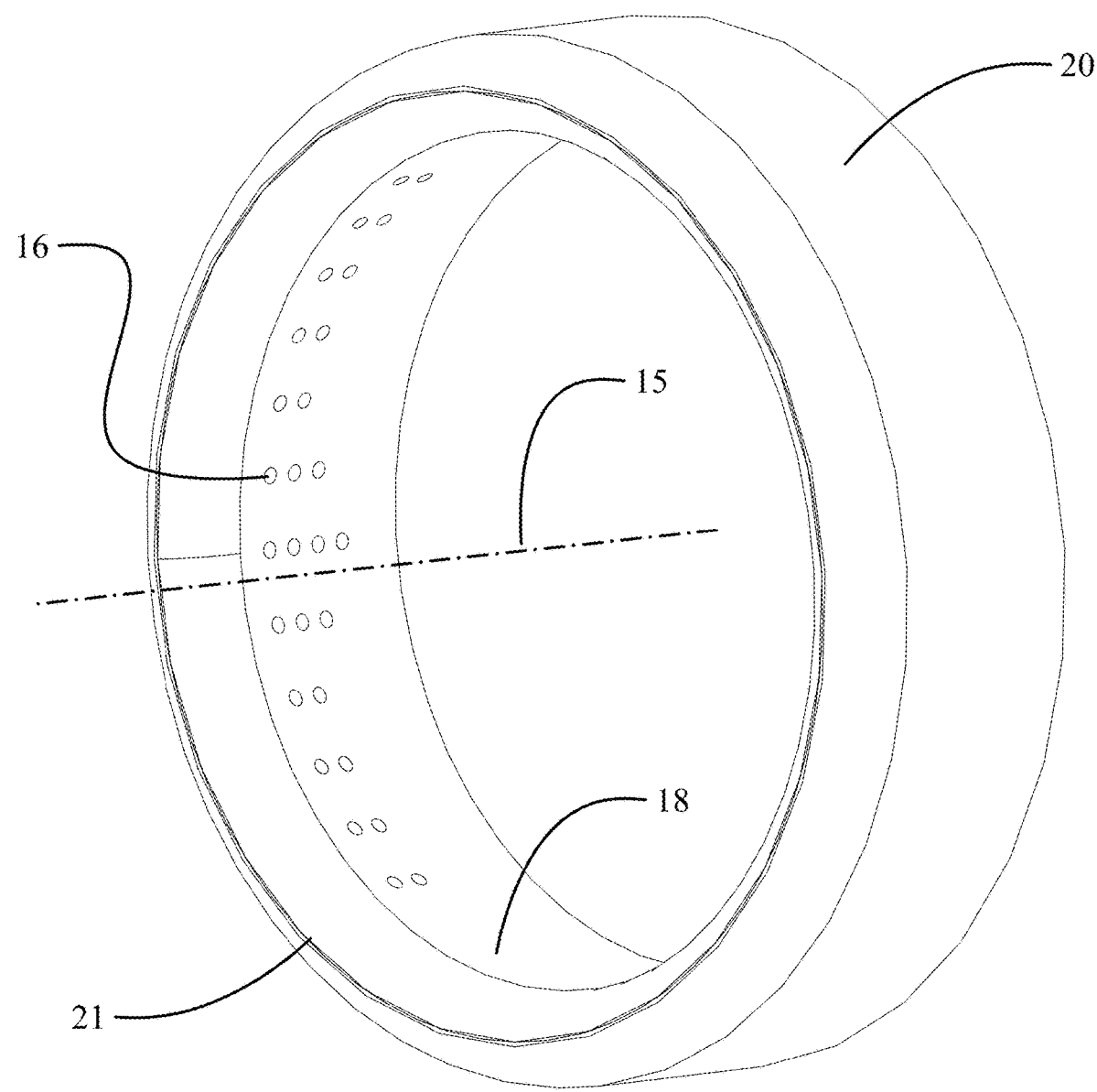
FIG. 2 is a pictorial representation of the engine nacelle inlet demonstrating an array of flow control devices employed in an example implementation.

Referring to the drawings, FIG. 1 depicts a large commercial aircraft 10 employing high bypass ratio turbofan engines 12 having ultra-short nacelles 14 in which implementations as described herein are employed. While the implementations described herein relate to commercial aircraft, the disclosure is applicable to any low L/D application or other inlet having asymmetrical flow distortion-. As seen in FIG. 2, a plurality of flow control devices 16 are integrated into an internal surface 18 of an inlet 20 of the ultra-short nacelle 14 forming one or more arrays (as will be described in greater detail subsequently) extending axially aft from a highlight 21 (or lip) of the inlet. The inlet 20 has a normal flow axis 15. As defined herein "flow control devices" may comprise pneumatic jets, fluidic oscillators, steady jets, unsteady pulsing jets, non-pneumatic-based flow control systems and zero-net-mass-flux devices such as electronic synthetic jets or a combination of the identified systems. In alternative implementations, arrays of deployable vortex generators, or other mechanical devices (pins, etc.) may replace the orifices for fluidic jets. The devices can be stowed, flush with the internal surface of the inlet, and then be deployed in patterns within the array to achieve the desired flow pattern. Such mechanical devices can also be deployed and stowed periodically at varying frequency. A control system (to be described in greater detail subsequently) operably connected to the flow control devices 16 is adapted to activate or modulate the flow control devices in selected subarrays responsive to the inlet flow state indicated by a predetermined flight condition or measured flow parameters within the inlet 20.

Figure 3:
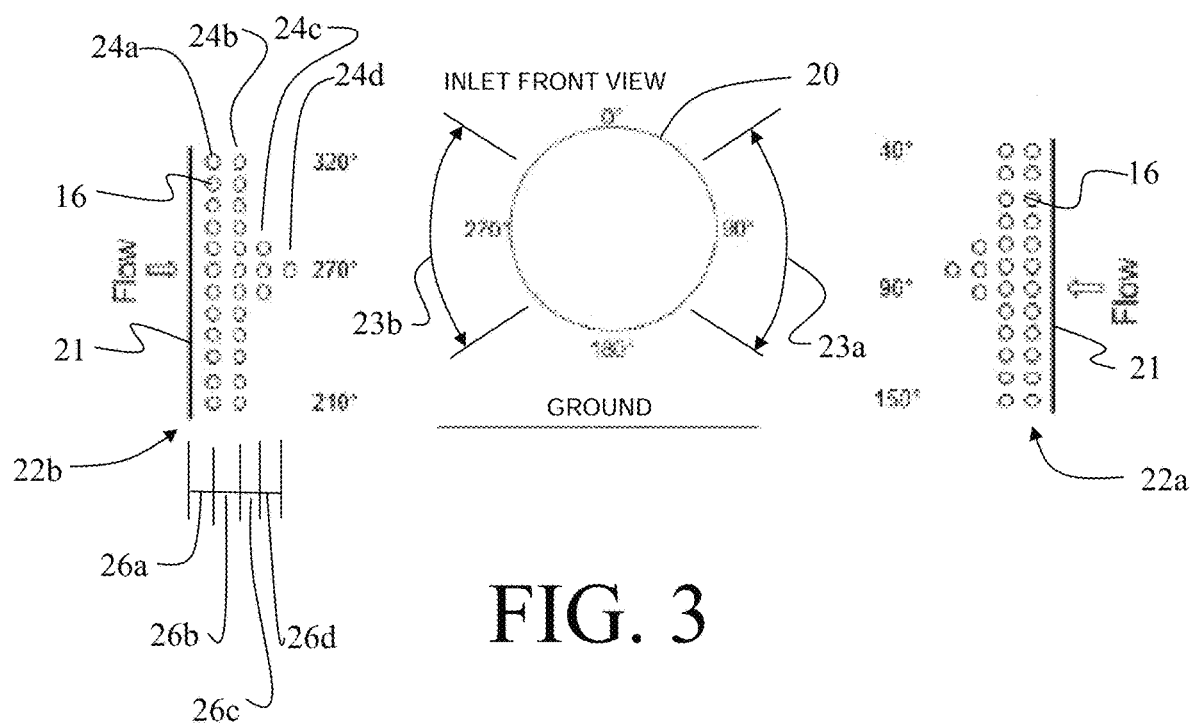
FIG. 3 is a schematic flat representation of lateral arrays of flow control devices as implemented over angular segments of the inlet.

FIG. 3 shows, in a flat layout presentation, right and left flow control device arrays 22a, 22b located on the internal surface 18 of the inlet 20. Right array 22a extends over an azimuthal range 23a determined based on an example flow separation domain for a right cross wind (defined herein relative to the drawings as flowing from right to left), between 40° and 150° relative to the normal flow axis 15 for the example implementation, while the left array 22b extends over a second azimuthal range 23b determined based on a flow separation domain for a left cross wind (defined herein relative to the drawings as flowing from left to right), between 320° and 210° for the example implementation. Each array 22a, 22b employs a plurality of circumferential rows 24a, 24b, 24c, 24d spaced at increasing first, second, third and fourth axial distances 26a, 26b, 26c, 26d from the highlight 21 of the inlet. Describing left array 22b, circumferential rows 24a and 24b have a first arrangement of flow control devices extending over the full azimuthal range of the array. Row 24c has a reduced azimuthal range centered at 270° and extending between 260° and 280°, while row 24d has a further reduced azimuthal range (a single jet at 270° in the example shown). For the example implementation, each row has a flow control device 16 at each 10° of azimuth within the range. While shown in the drawings for the example implementations as circular orifices, the flow control devices 16 may have slotted apertures or alternative geometric configurations.

Figure 4:
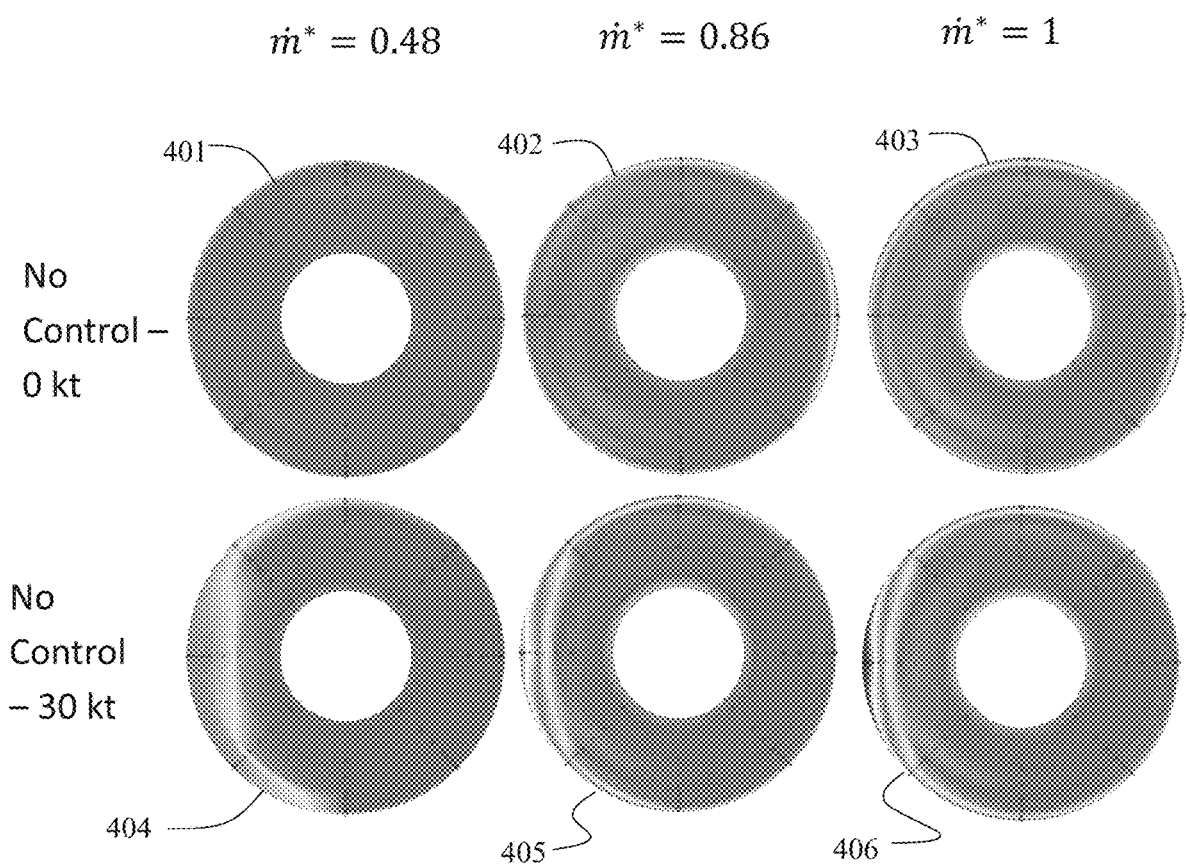
FIG. 4 is a presentation of flow distortion patterns in the inlet at various mass flow rates and crosswind conditions.

The implementation shown in FIG. 3 provides the left and right arrays for response to vector components of left and right crosswind flow relative to the normal flow axis 15. FIG. 4 shows visualization of flow distortion in the inlet for a left crosswind component with 0 kt of crosswind at mass flow rates (defined as $\dot{m}^*$, non-dimensionalized as mass flow rate divided by the maximum mass flow rate for the inlet) of $\dot{m}^*=0.48$, map 401; $\dot{m}^*=0.86$, map 402; and $\dot{m}^*=1$, map 403. The maps shows very little distortion in the flow into the inlet with 0 kt of crosswind. However, with a 30 kt crosswind component at flow rates of $\dot{m}^*=0.48$, map 404; $\dot{m}^*=0.86$, map 405; and $\dot{m}^*=1$, map 406, significant distortion is present.

Figure 5:
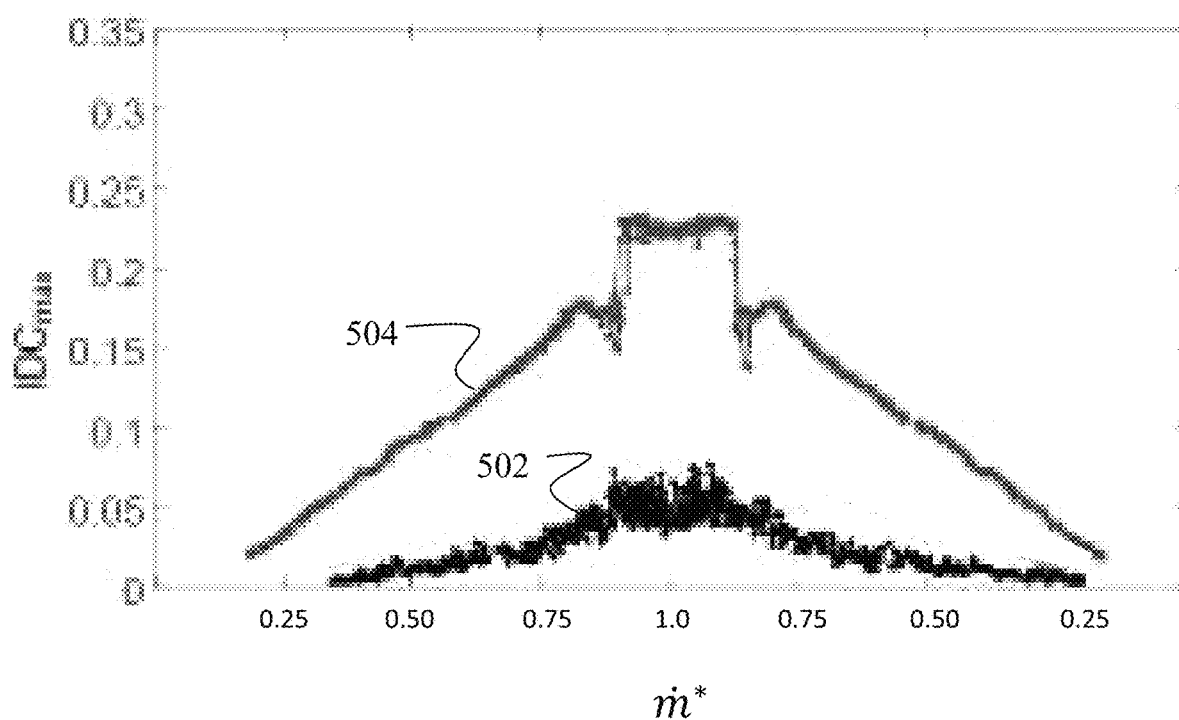
FIG. 5 is a graph of inlet distortion coefficient at conditions of not crosswind and 30 knots crosswind.

For purposes of quantitative description of the flow distortion herein, an inlet distortion coefficient, IDC, is defined as $$IDC = \mathrm{MAX}_{i=1}^{nradius-1}\left(0.5\left[\frac{(\overline{P_i} - P_{min_i})}{\overline{P}} + \frac{(\overline{P_{i+1}} - P_{min_{i+1}})}{\overline{P}}\right]\right)$$

Where $\overline{P}$ is the average pressure and $P_{min}$ is the minimum pressure on the i-th ring (measured at constant radius circumferential rings). A maximum distortion defined as $IDC_{max}$ corresponds to the maximum IDC and yields the maximum circumferential distortion that the inlet sees. FIG. 5 provides a plot of $IDC_{max}$ for the 0 kt condition, trace 502, and the 30 kt condition, trace 504, for a baseline condition with no activation of the flow control devices 16 in the described implementation.

Figures 6A, 6B, 6C:
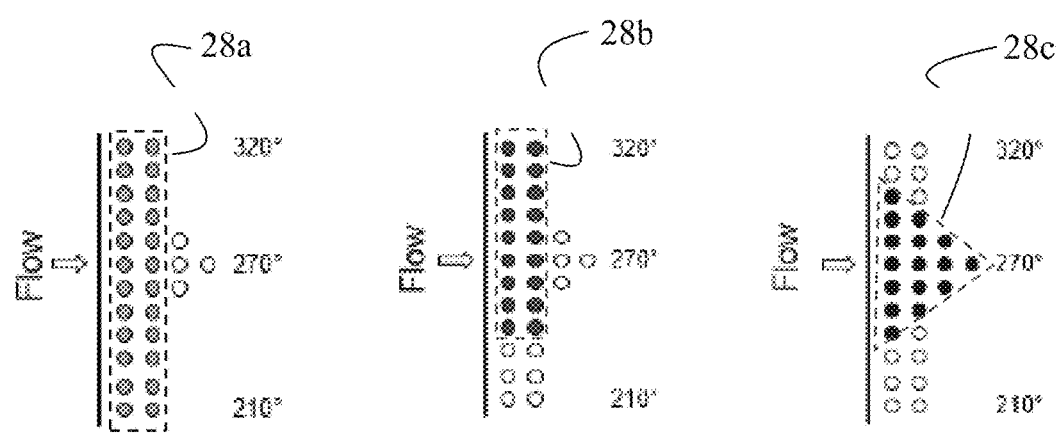
FIGS. 6A-6C are schematic flat representations of subarrays of flow control devices for activation at differing mass flow rates for crosswind compensation.
Figure 8A:
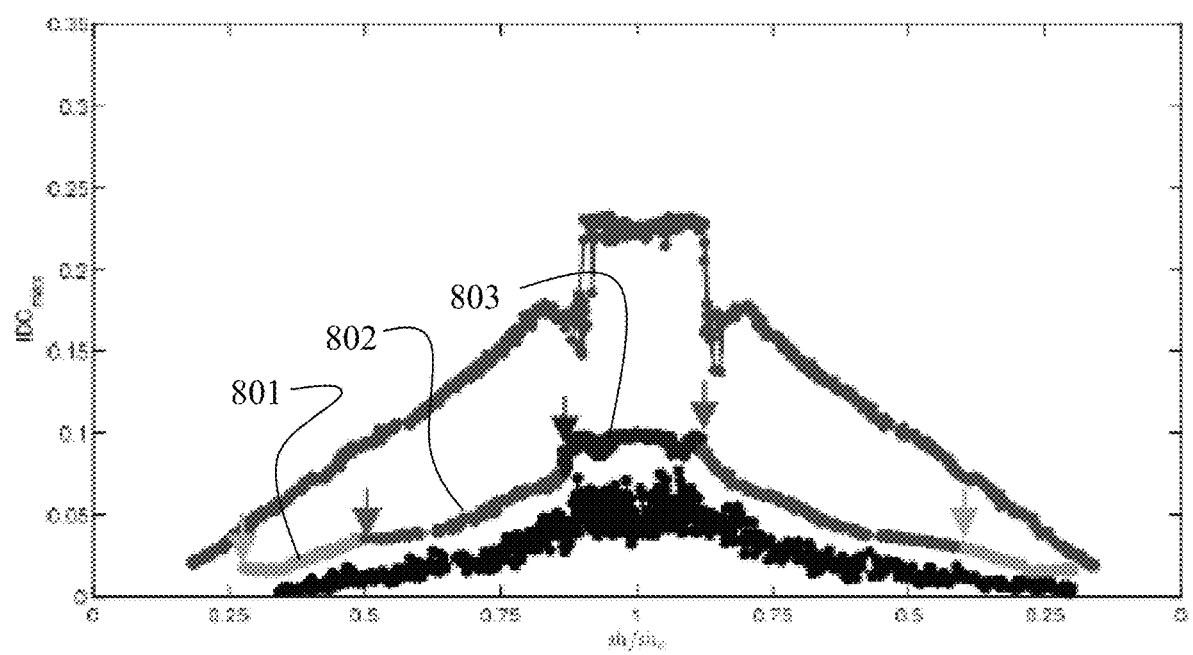
FIG. 8A is a graph of maximum inlet distortion correction by activation of the different subarrays over selected mass flow rates.
Figure 8B:
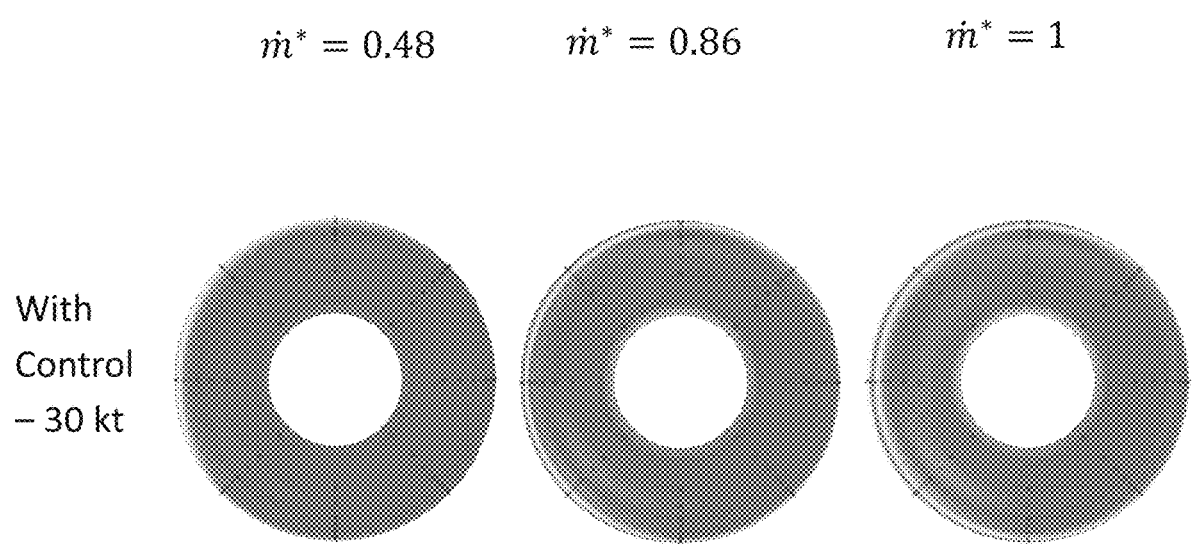
FIG. 8B is a presentation of improved flow distortion patterns in the inlet at various inlet mass flow rates with a 30 kt crosswind condition and control imposed as displayed in FIG. 8A.

As demonstrated in FIGS. 6A-6C, selective activation of flow control devices 16 in subarrays within left array 22b is accomplished to mitigate the flow distortion created by a left crosswind component as described with respect to FIG. 4 and FIG. 5. For the example shown in the drawings, activation of a first subarray 28a seen in FIG. 6A results in modification of $IDC_{max}$ over the entire mass flow range as shown in FIG. 7A as trace 701. Similarly, activation of a second subarray 28b shown in FIG. 6B results in modification of $IDC_{max}$ as shown in FIG. 7B as trace 702 while activation of the third subarray 28c shown in FIG. 6C results in modification of $IDC_{max}$ as shown in FIG. 7C as trace 703. In one example control scenario, switching between the activated subarrays is accomplished depending on the mass flow range; the first subarray 28a is activated at mass flow rates between 0 and 0.48, the second subarray 28b is activated at mass flow rates between 0.48 and 0.82, and the third subarray 28c is activated a mass flow rates between 0.82 and 1. This results in modification of $IDC_{max}$ as shown in FIG. 8 where trace segment 801 relates to $IDC_{max}$ modification over the flow range of 0 to 0.48 with first subarray 28a activated, trace segment 802 relates to $IDC_{max}$ modification over the flow range of 0.48 to 0.82 with second subarray 28b activated and trace segment 803 relates to $IDC_{max}$ modification over the flow range of 0.82 to 1.0 with third subarray 28c activated. The overall reduction in $IDC_{max}$ over the entire flow range is optimized. The resulting reduction in flow distortion is show in FIG. 8B. In other implementations (or in alternative operation of the implementation shown), various combinations of flow control devices in subarrays and individual or combined activation of subarrays may be employed for tailoring flow correction based on varying conditions of crosswind velocity and inlet mass flow rate.

Operation of array 22a for right crosswind components is similar to the operation of array 22b described for left crosswind components.

Figure 9:
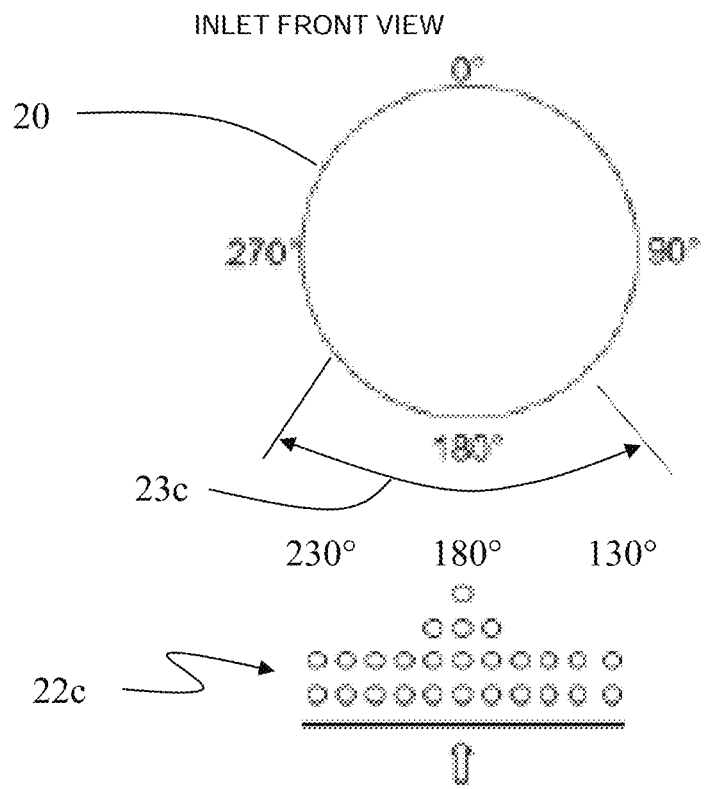
FIG. 9 is a schematic flat representation of a bottom array of flow control devices for flow control in high angle of attack or ground vortex scenarios.

In alternative implementations, separately or in addition to the flow control device arrays 22a, 22b for crosswind distortion correction, one or more arrays 22c of flow control devices may be employed in an azimuthal range 23c over a bottom portion of the internal surface of the inlet, 130° to 230° as shown in FIG. 9 as an example, to accommodate control of flow distortion due to a high angle of attack (aircraft pitch up) scenario or a ground vortex scenario, where flow separation occurs substantially on a bottom internal surface of the inlet or on the bottom surface and one or both sides of the inlet. Operation of array 22c may be comparable to that disclosed for array 22b and may be combined with operation of array 22a or array 22b.

While described herein with respect to specific flight conditions of crosswind, angle of attack and ground vortex, the implementations provide the ability for flow control based on generalized flight conditions for the freestream velocity including flow speed, flow angle with respect to the engine, engine inlet mass flow rate and altitude which constitute as the instantaneous flight condition.

Figure 10:
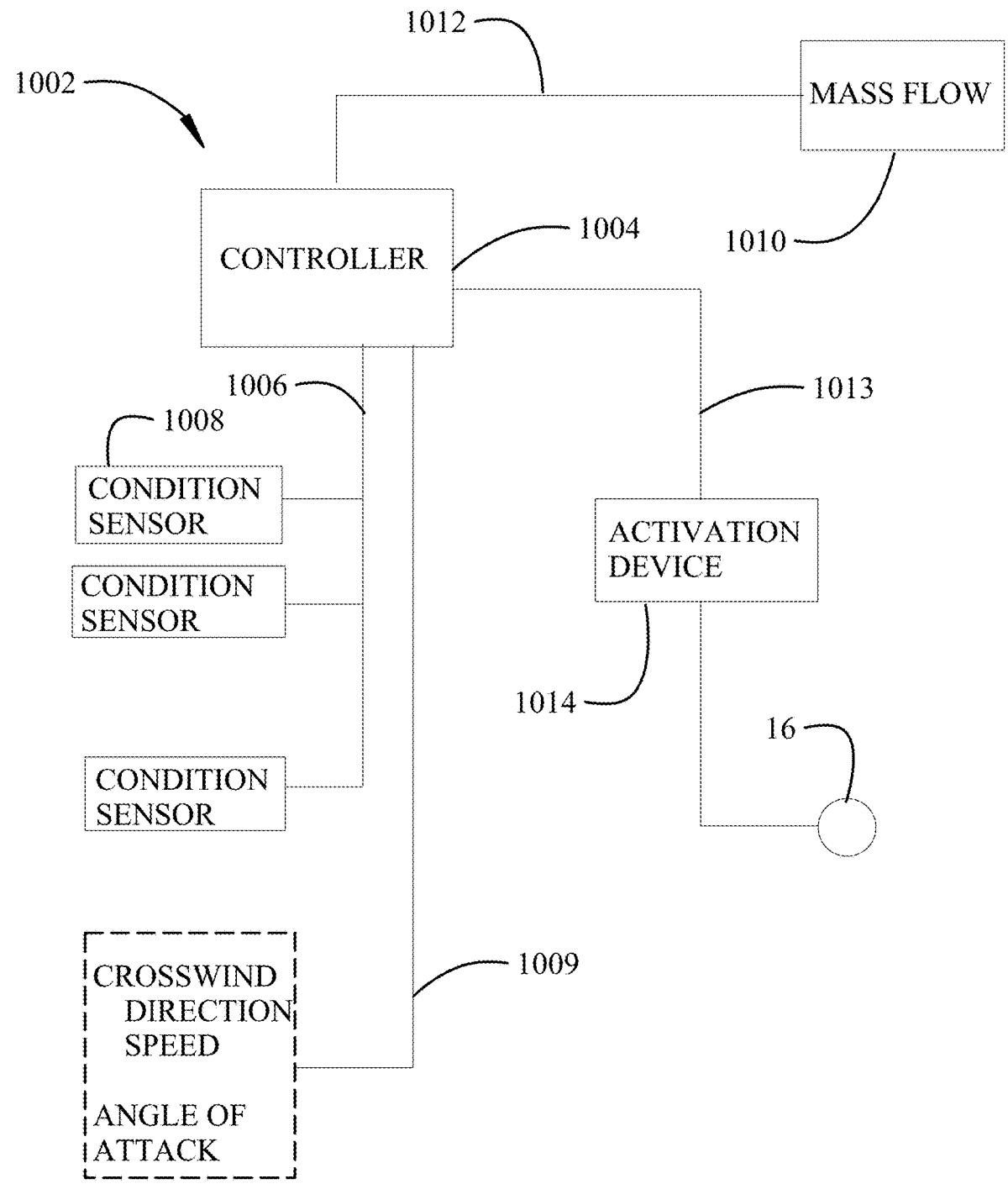
FIG. 10 is a block diagram of an example control system.

A control system 1002, as shown in FIG. 10, employs a controller 1004 receiving a condition input 1006 from one or more condition sensors 1008. The condition sensors 1008 may be pressure sensors or other sensing systems such as optical or ultrasonic detectors for boundary layer separation or internal turbulence in the inlet 20. Crosswind direction and speed (or angle of attack) may be provided by various aircraft onboard systems or external input as a status signal 1009 to be received by the controller 1004. One or more mass flow sensors 1010 also provides an inlet mass flow input 1012 to the controller 1004. The inlet mass flow input 1012 may alternatively be derived from external inputs such as thrust lever position or fan speed. Responsive to an inlet condition determined by the status signal 1009, the condition sensors 1008 and mass flow sensors 1010, the controller 1004 provides a control signal 1013 to one or more activation devices 1014 configured to activate flow control devices 16 in the arrays, previously described, individually or in subarrays. The control signal may also provide or modulate a jet flow rate or vortex generator deployment frequency for the flow control devices 16, as described in greater detail subsequently. The controller may operate in an open loop based on the status signal 1009 and inlet mass flow input 1012 or may provide closed loop control with feedback from the condition sensors 1008 and mass flow sensors 1010.

In an open-loop implementation, the controller 1004 does not react to the condition of the flowfield. Instead, it acts solely on a pre-planned schedule that targets specific actuation intensities and locations based on the flight condition that is measured at the time, such as the current engine inlet mass flow rate, the flight speed, the crosswind speed and direction and altitude.

In a closed-loop implementation, the controller 1004 responds to the "condition" of the flowfield in the inlet. The mass flow sensors 1010 and condition sensors 1008 provide continuous monitoring to the controller 1004 such that the controller is continuously providing an updated control signal 1013 to the activation devices 1014. The flow control system is only active if the controller 1004 has determined that flow separation has occurred (or is expected to be present based on conditions).

Figure 11A:
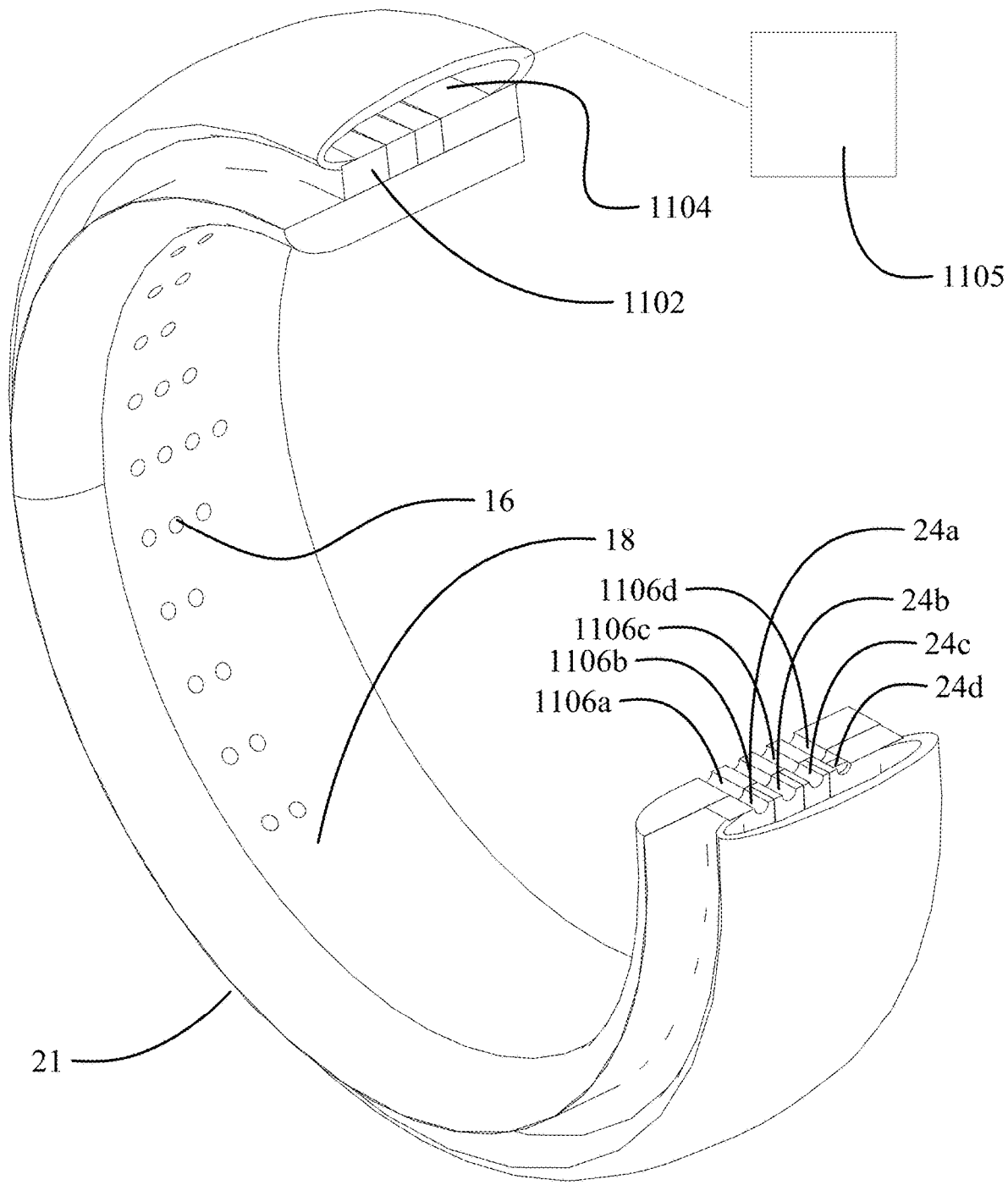
FIGS. 11A-11D are representations of concentric cylinders spaced between the inlet internal surface and a pressure plenum for control jet actuation for flow jets as the flow control devices.
Figure 11B:
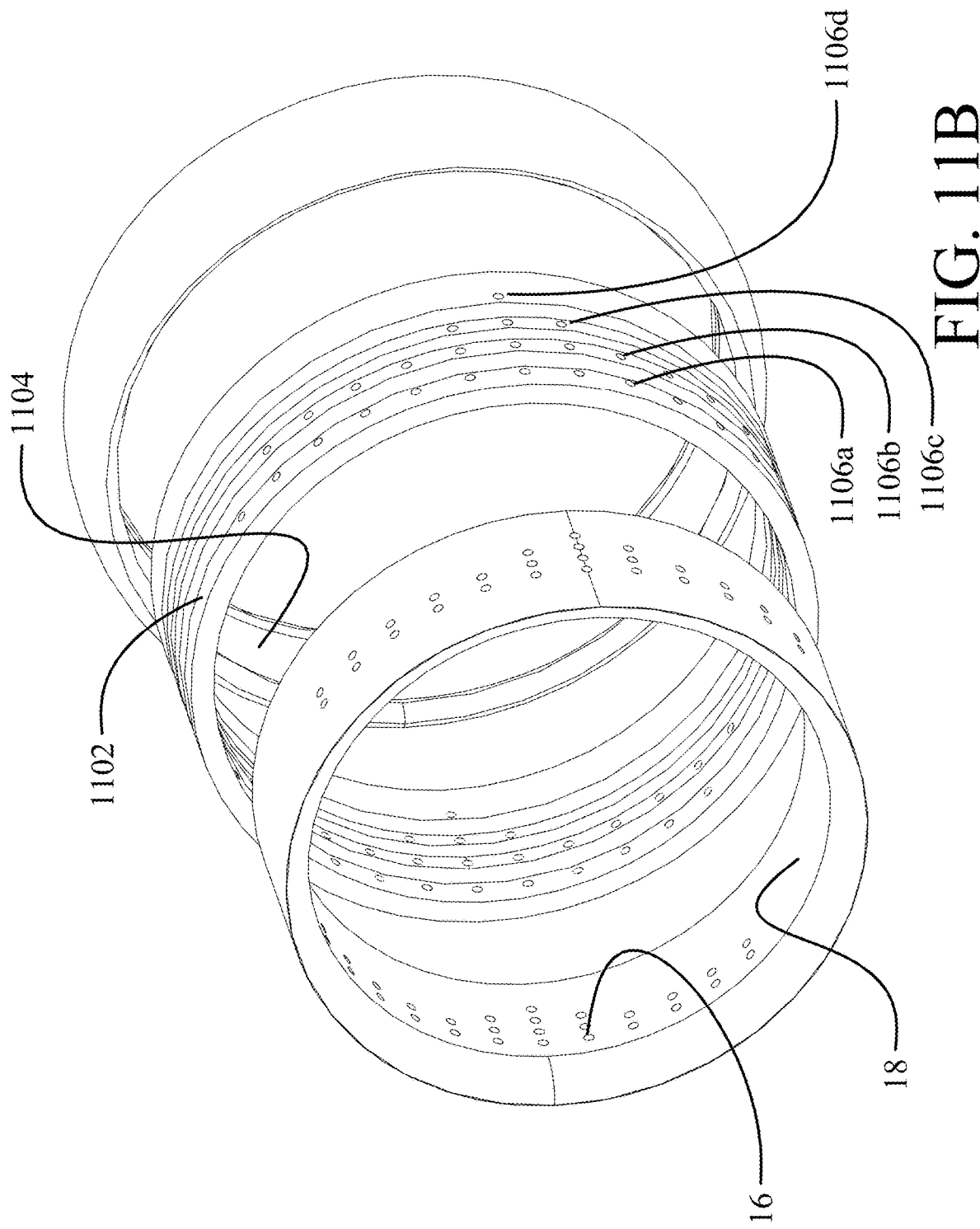
Figure 11C:
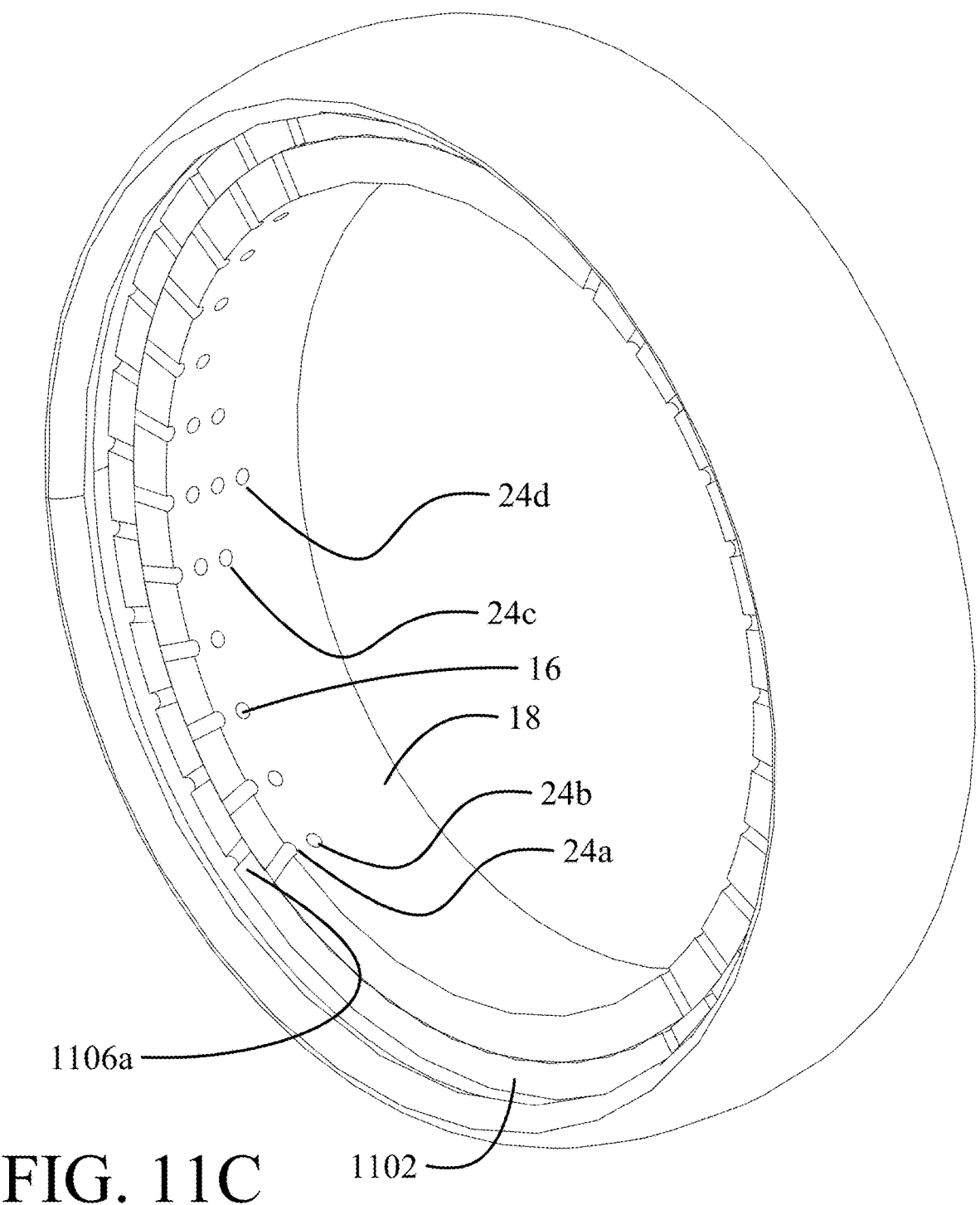
Figure 11D:
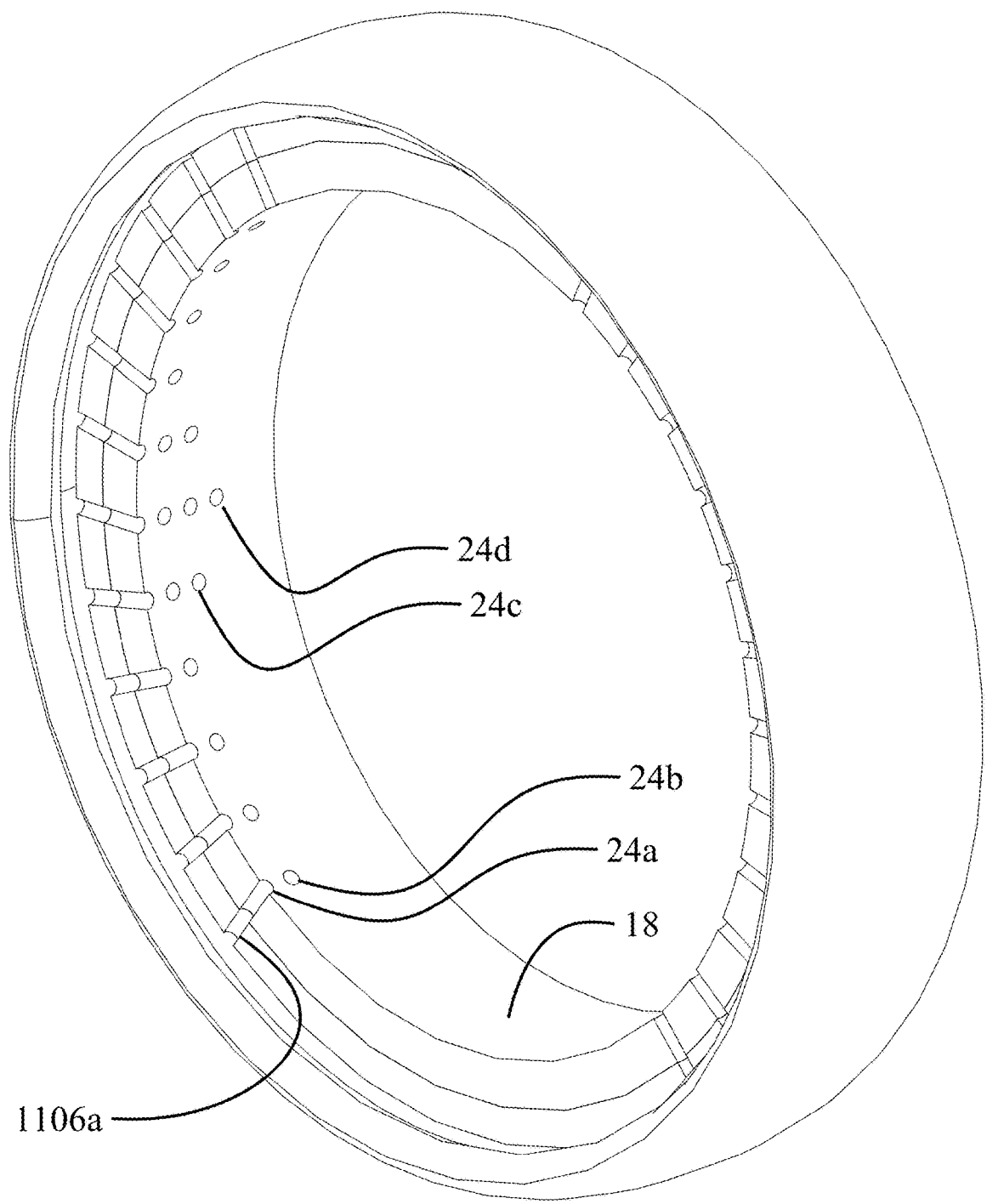

For a combination of the above, in an open loop configuration, the controller 1004 will actuate predetermined arrays or subarrays and at intensities for the flow control devices 16 targeting the expected region of flow separation based on the status signal 1009 and then convert to continuous monitoring of the mass flow sensors 1010 and condition sensors 1008 for a closed-loop configuration. The arrays or subarrays in the closed-loop configuration may be determined in real time and may include multiple or single flow control devices 16 responsive to the condition sensors 1008 in real time depending on the configuration of the activation devices as described subsequently In an example implementation seen in FIG. 11A and in exploded pictorial representation in FIG. 11B, the flow control devices 16 are control jets and the activation devices 1014 are one or more concentric cylinders 1102, or cylinder segments, spaced between the internal surface 18 of the inlet and a pressure plenum 1104 (wall thicknesses of the components are exaggerated for clarity). The pressure plenum 1104 is connected to a bleed air system 1105 or other pressure source. The concentric cylinders have aperture arrays 1106a-1106d rotatable from a "closed" position as seen in FIG. 11C into alignment with the control jets in circumferential rows 24a-24d to open the subarrays 28a, 28b or 28c to the pressure plenum 1104 for jet flow as shown in FIG. 11D. Activation devices 1014 are motors engaged to the concentric cylinders 1102 to rotate the cylinders from the closed to aligned positions. While shown in the FIGS. 11A-11D with single apertures with one-to-one correspondence with the flow control devices in the corresponding rows, each concentric cylinder may be rotatable in multiple steps within the 10° separation of devices with the stepped arrays having apertures or blank closure to accommodate differing azimuthal range of the particular subsets of flow control devices in the row to obtain the subarrays 28a, 28b and 28c previously described. In alternative implementations individual sliding or rotatable doors may provide closed and open conditions for the flow control devices 16.

Figure 11E:
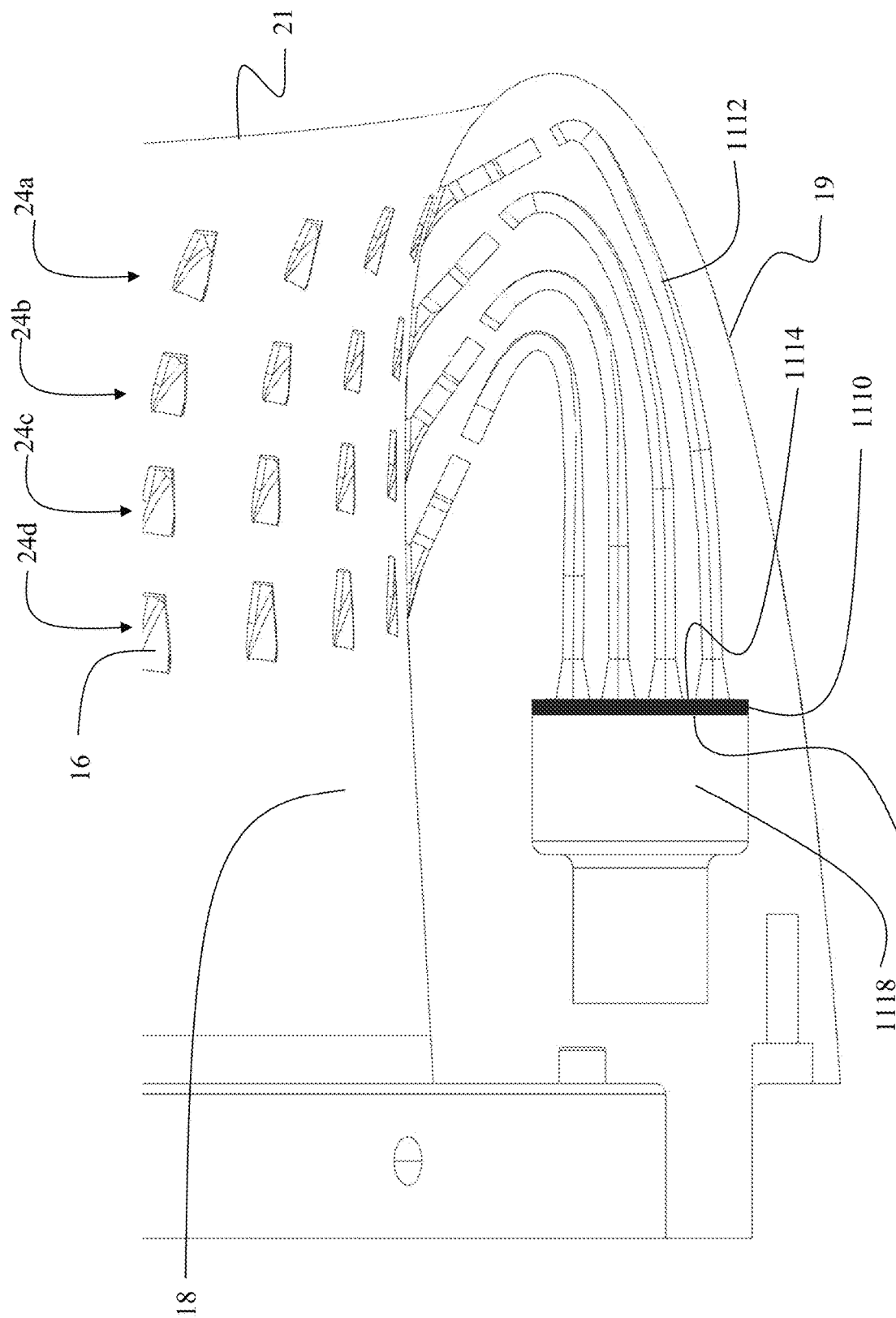
FIGS. 11E-11O are representations of annular perforated plates controlling flow communication through conduits between the inlet internal surface and a pressure plenum for control jet actuation for flow jets as the flow control devices.
Figure 11G:
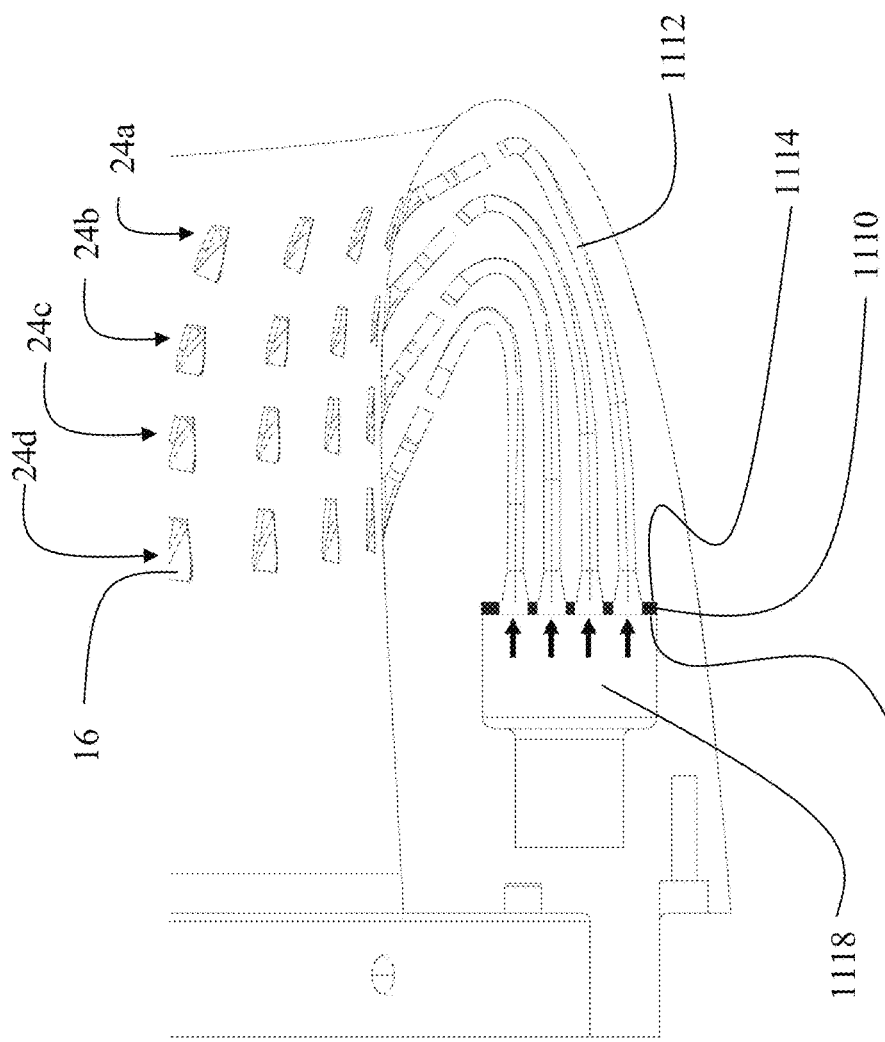
Figure 11F:
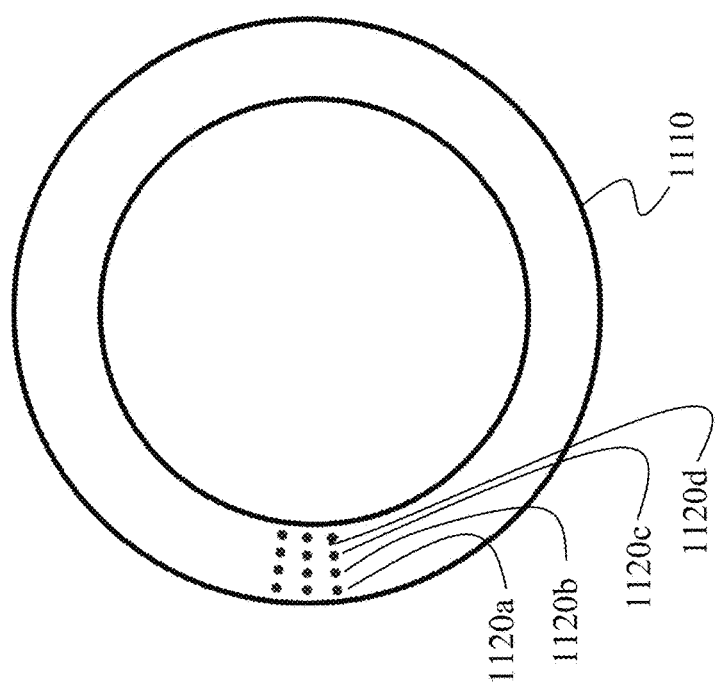
Figure 11I:
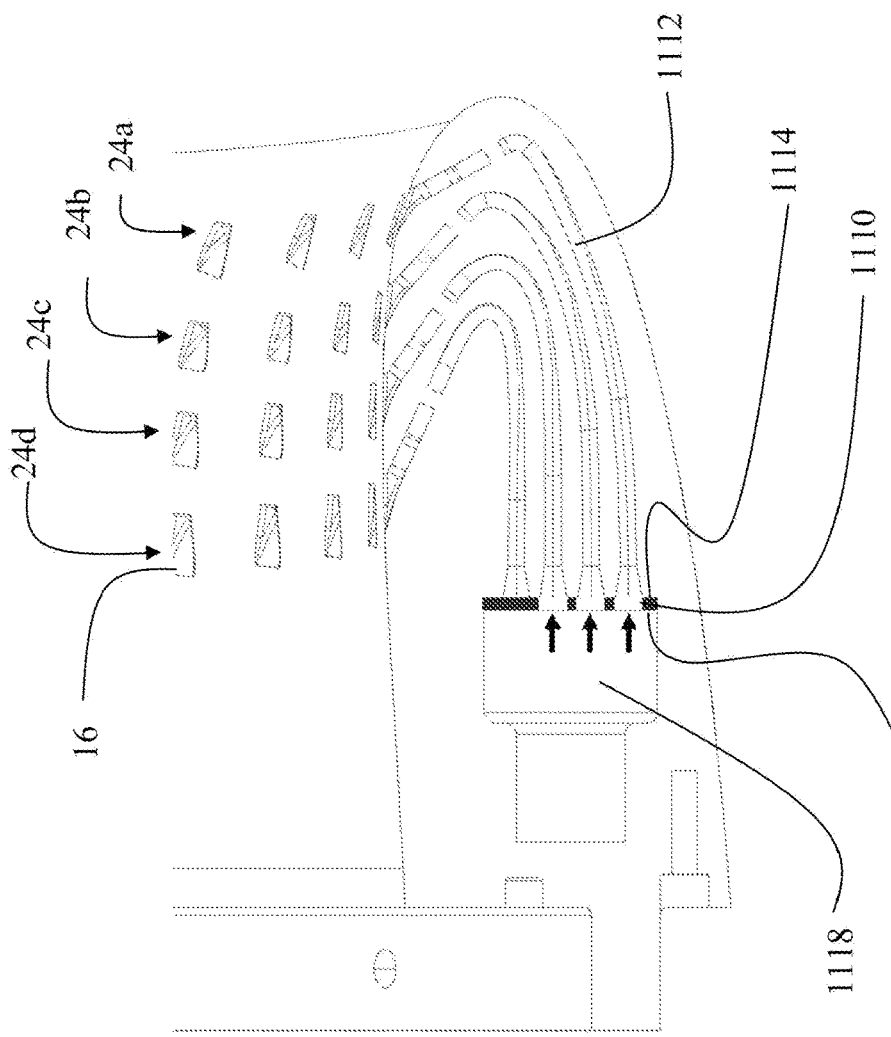
Figure 11H:
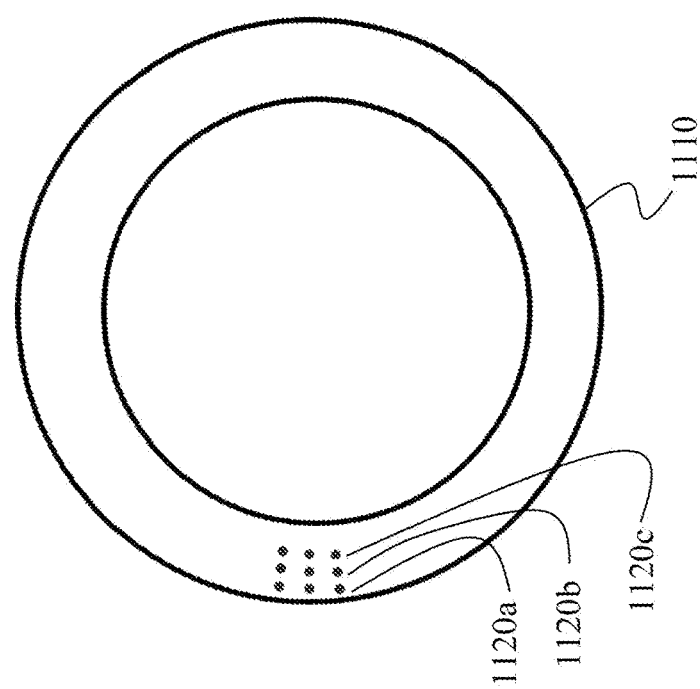
Figure 11K:
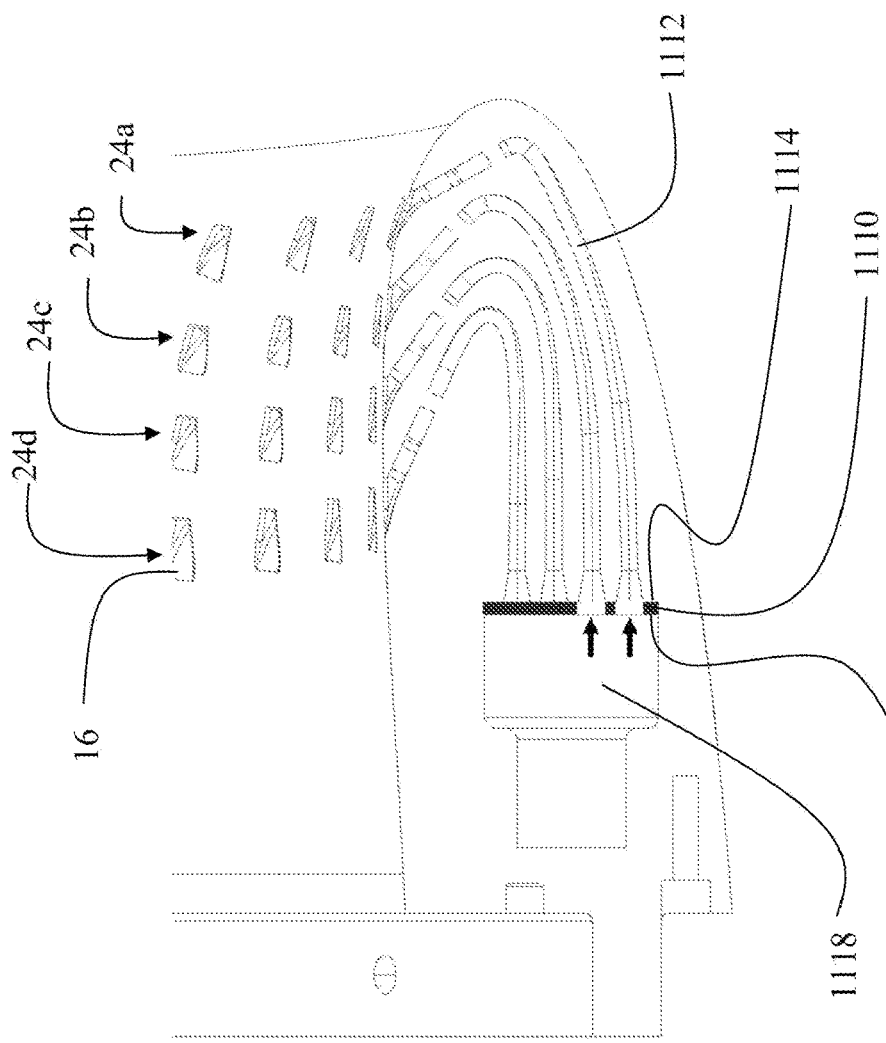
Figure 11J:
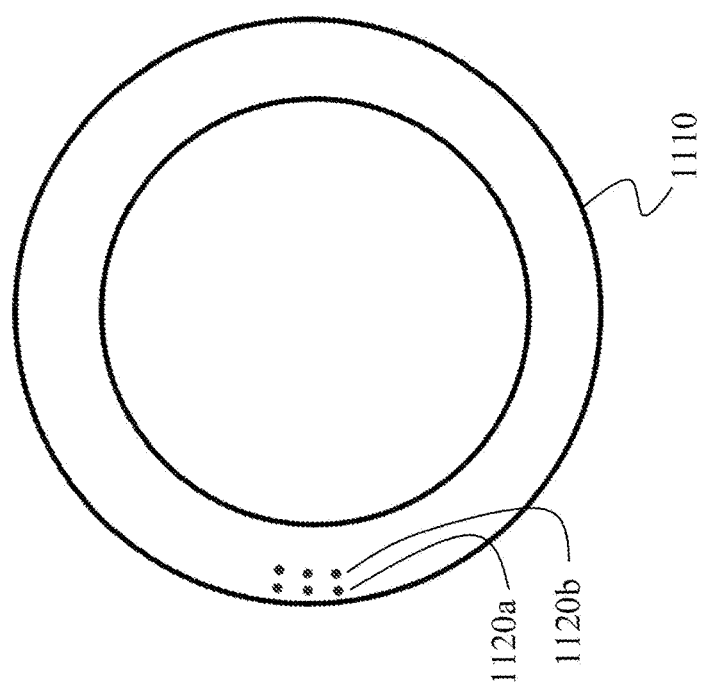
Figure 11M:
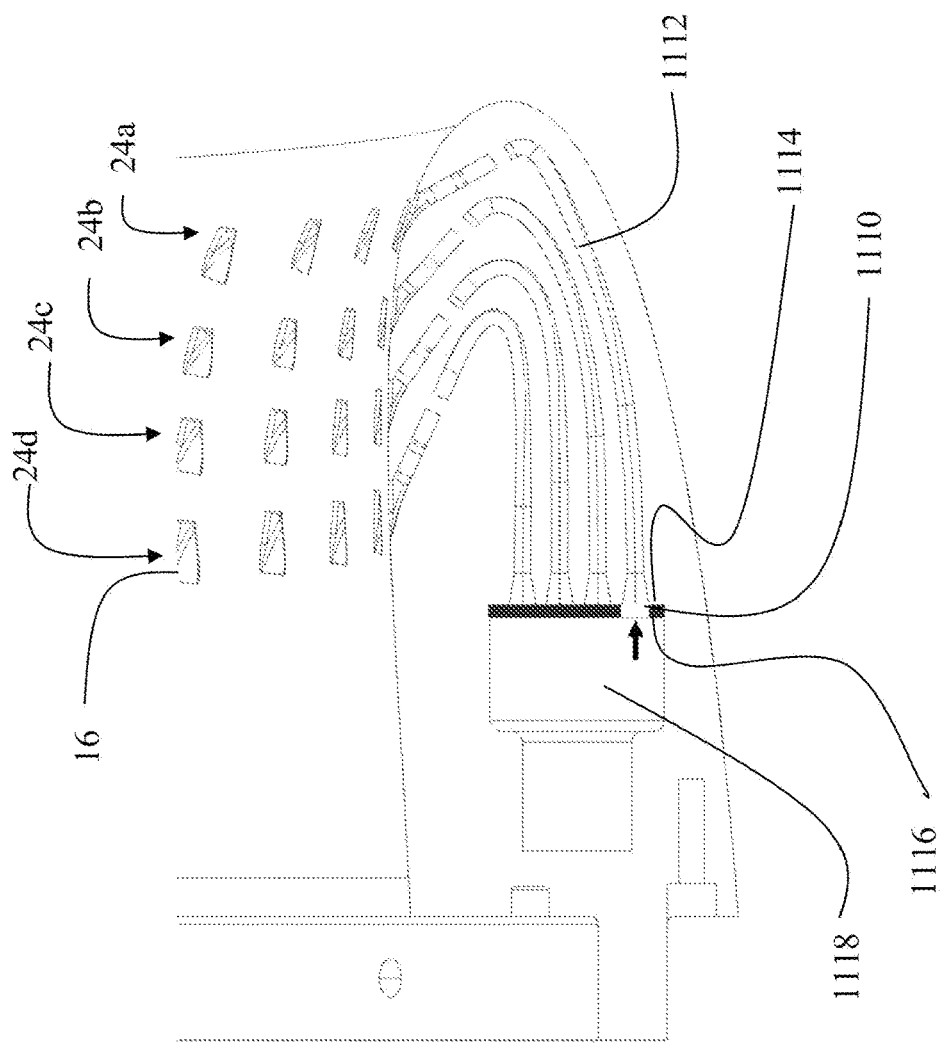
Figure 11L:
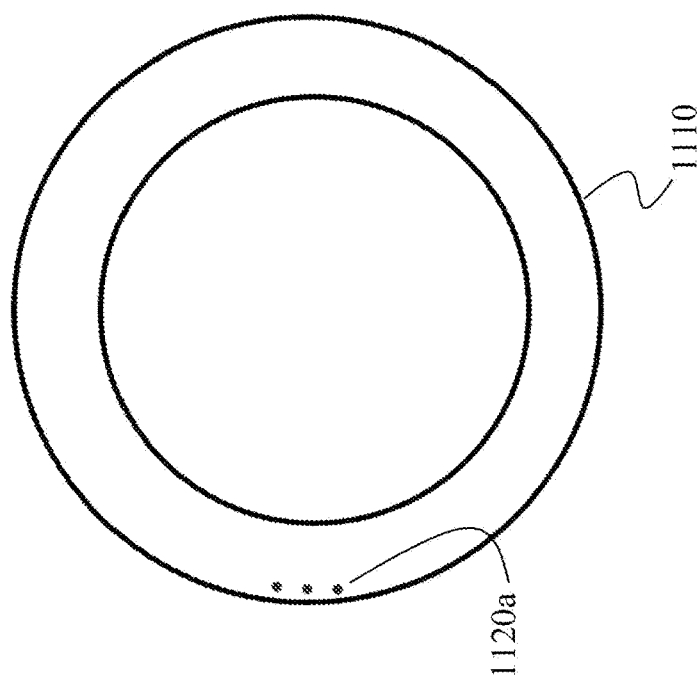
Figure 11O:
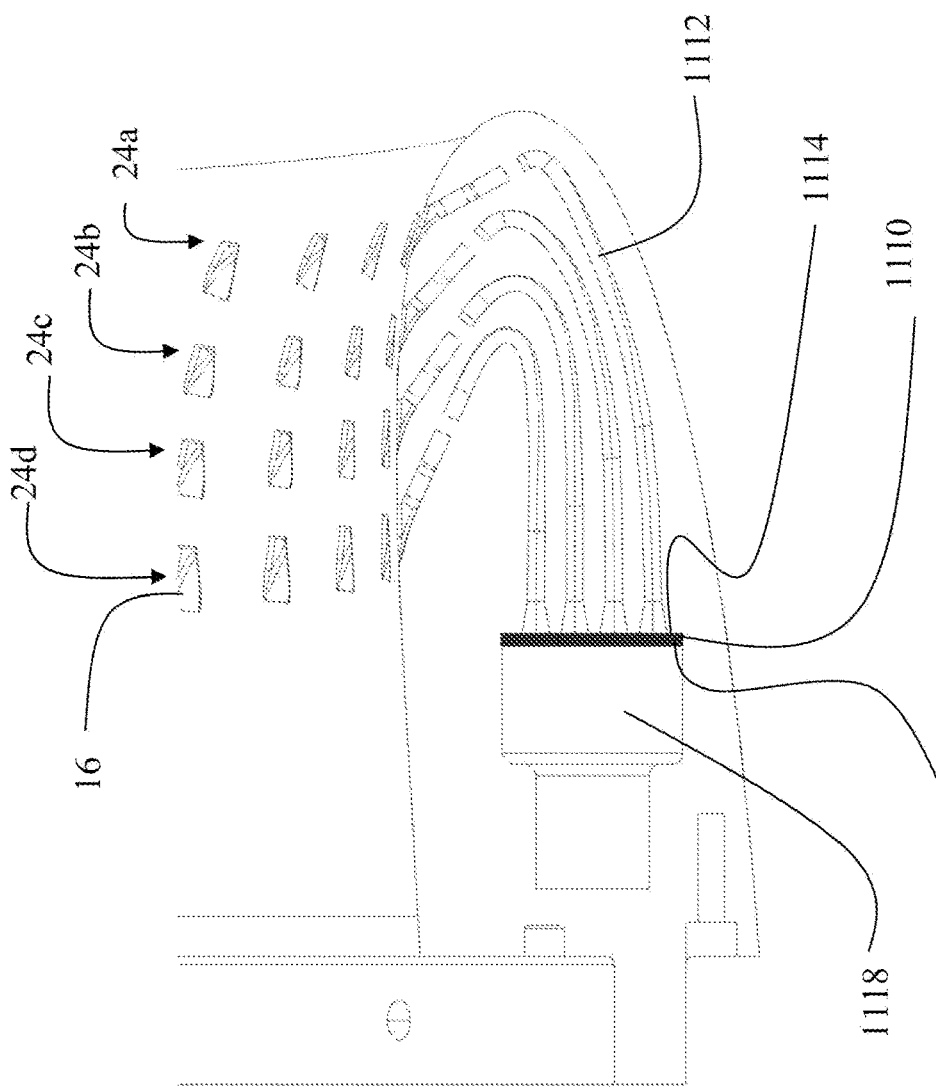
Figure 11N:
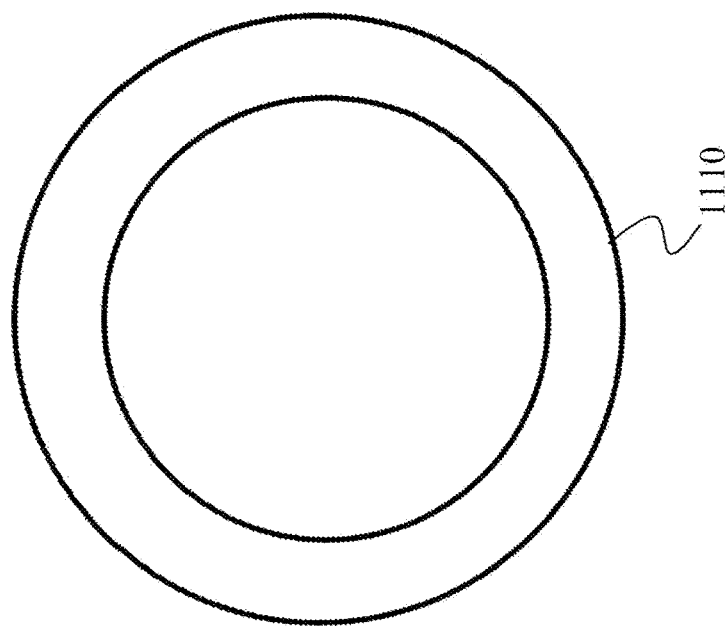

In a similar example implementation seen in FIGS. 11E-11O, the flow control devices 16 are control jets and the activation devices 1014 are one or more perforated annular plates 1110, or plate segments, substantially perpendicular to the normal flow axis 15, located between the internal surface 18 and an outer surface 19 of the inlet, with conduits 1112 extending from an interface 1114 of the annular plate 1110 to the flow control devices 16 on the internal surface 18 of the inlet. A second interface 1116 of the plate is in communication with a pressure plenum 1118. As in the prior implementation, the pressure plenum 1118 is connected to a bleed air system or other pressure source. The annular plates 1110 have aperture arrays 1120a-1120d as seen in FIG. 11F rotatable from a "closed" position as seen in FIG. 11E and FIGS. 11N and 11O, into alignment with the control jets in circumferential rows 24a-24d to open various subarrays to the pressure plenum 1118 for jet flow as shown in FIGS. 11F and 11G with the full subarrays open to partial subarrays as shown in FIGS. 11H and 11I, 11J and 11K, and 11L and 11M. Activation devices 1014 are motors engaged to the annular plates 1110 to rotate the plates about the normal flow axis 15 from the closed to a plurality of aligned positions. While shown in the FIGS. 11A-11D with single apertures with one-to-one correspondence with the flow control devices in the corresponding rows, the annular plate 1110 may be rotatable in multiple steps within the 10° separation of devices with the stepped arrays having apertures or blank closure to accommodate differing azimuthal range of the particular subsets of flow control devices in the row to obtain various subarrays.

Figure 12:
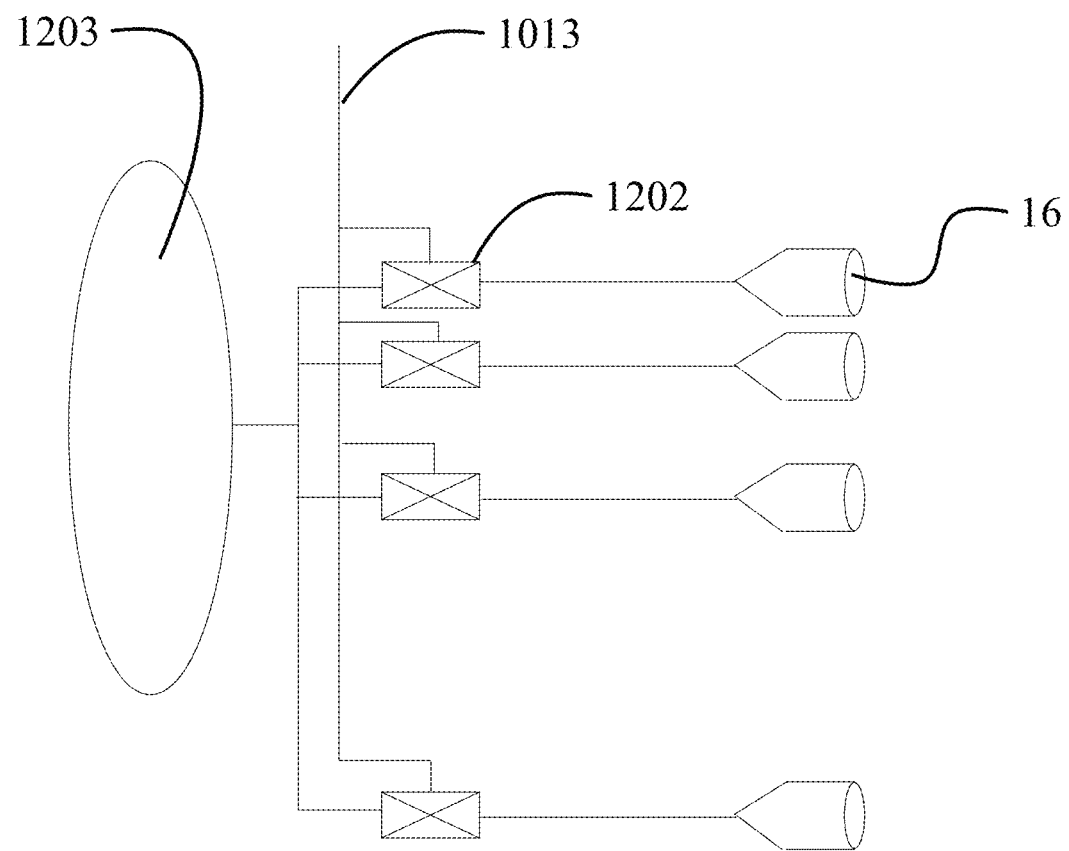
FIG. 12 is a representation of individual control of flow jets to form the array of the flow control devices.
Figure 13:
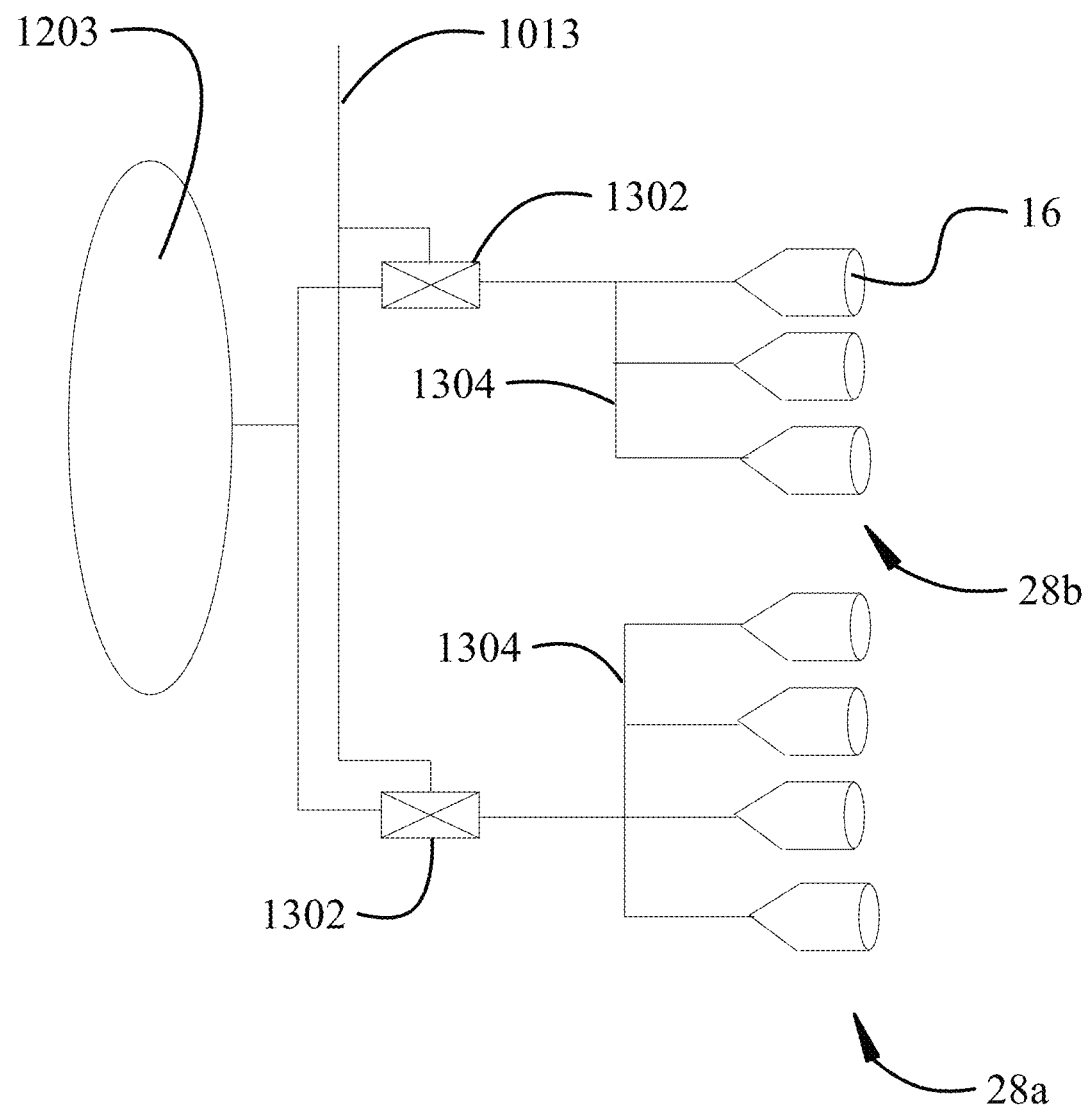
FIG. 13 is a representation of control of manifolded flow jets as the flow control devices.

In another example implementation represented schematically in FIG. 12, electrically or hydraulically controlled valves 1202 provide activation devices to connect corresponding ones of the flow control devices 16 to a pressure source 1203 such as a bleed air system. Controller 1004 activates one or more selected valves 1202 with control signal 1013 for predetermined arrays or subarrays of the flow control devices. As opposed to control of individual flow control devices, manifold valves 1302 may be connected between the pressure source and one or more manifolds 1304 in fluid communication with arrays or subarrays 28a, 28b of the flow control devices 16 as shown in FIG. 13.

The implementations as described with respect to FIGS. 11A-13 may also be applied as a pneumatic-based flow control system that employs suction instead of blowing, i.e. jets, or a combination of suction and blowing.

Figure 14:
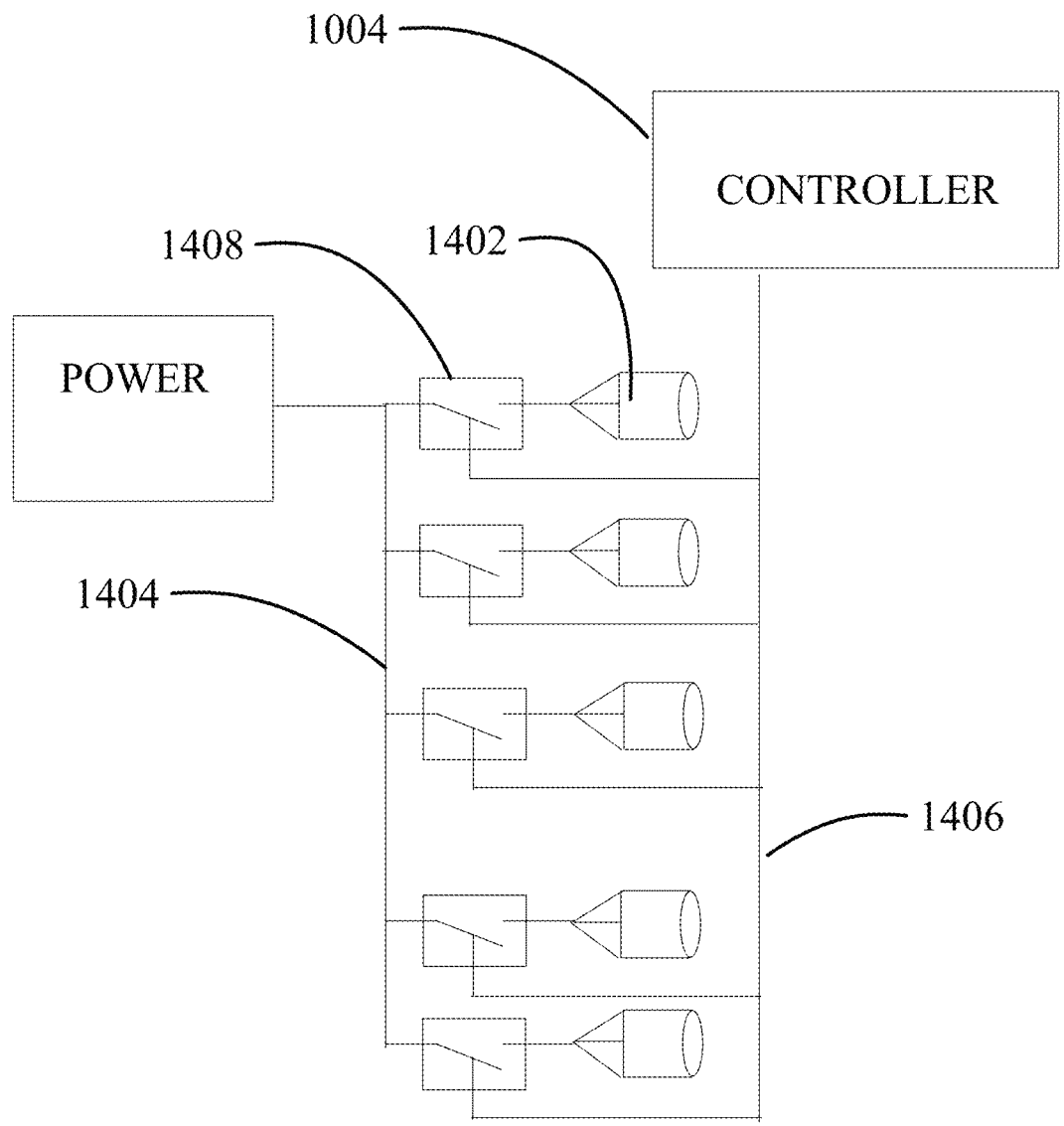
FIG. 14 is a representation of control of individual synthetic jets to form the array of flow control devices.

As shown in FIG. 14, synthetic jets 1402 may be employed as the flow control devices at the array locations on the internal surface 18 of the inlet 20 and may be directly activated by the controller 1004 to provide flow modification in the inlet. Power connections 1404 and level control 1406 (such as Pulse Width Modulation (PWM) jet modulation) may be directly controlled by the controller 1004 through relays 1408 or other appropriate control elements to activate each of the synthetic jets controllable by the controller 1004 to produce the selected subarrays 28a, 28b, 28c.

Figure 15:
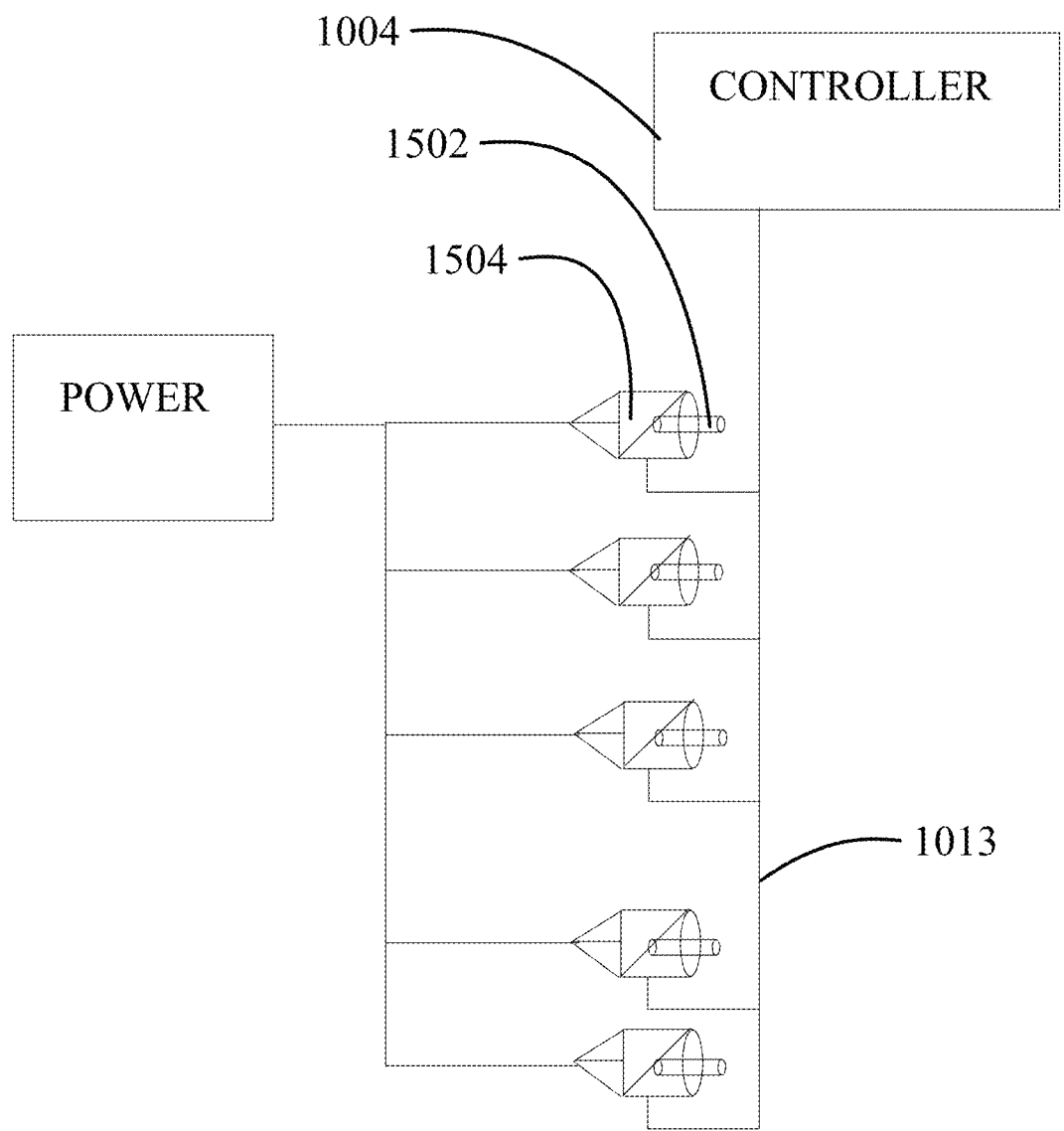
FIG. 15 is a representation of control of individual deployable vortex generators as the array of flow control devices; and, FIG. 16 is a flow chart of a method for flow control in a low L/D fan jet inlet.

FIG. 15 schematically demonstrates alternative implementations with arrays of deployable vortex generators, or other mechanical devices such as pins 1502 extended and retracted by solenoid operators 1504 or similar components acting as the activation devices responsive to the control signal 1013. The pins 1502 can be deployed and stowed periodically at varying frequency to obtain the desired flow modification.

Figure 16:
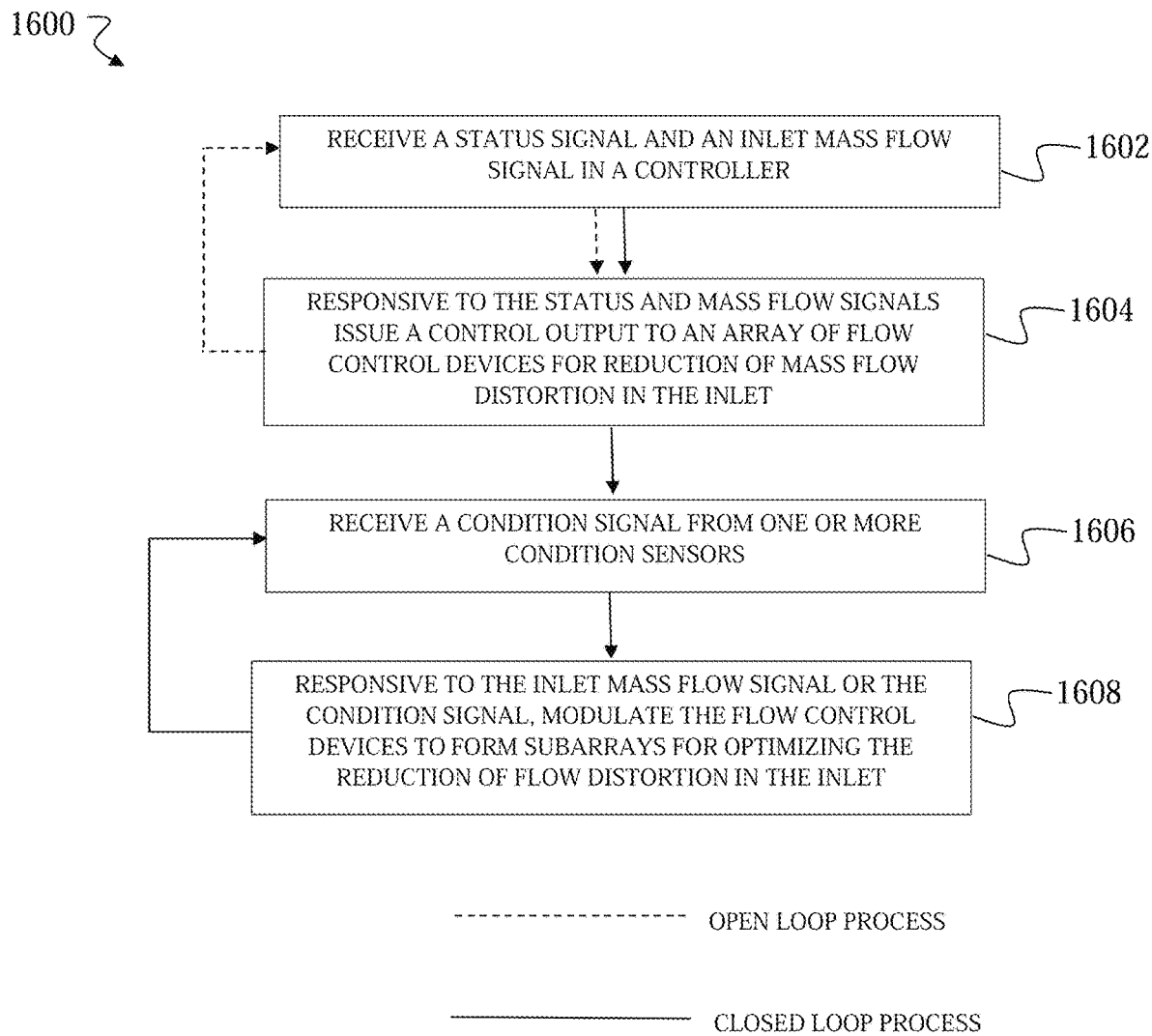

The implementations disclosed provide a method 1600 for flow control in a low L/D fan jet inlet as shown in FIG. 16. A controller receives a status signal and an inlet mass flow signal, step 1602. Responsive to the status and inlet mass flow signals, the controller provides a control output to one or more of a plurality of flow control devices in an array on an inlet internal surface for reduction of flow distortion in the inlet, step 1604. The controller receives a condition signal from one or more condition sensors, step 1606. Responsive to the inlet mass flow signal or the condition signal, the controller modulates the flow control devices to form subarrays for optimizing the reduction of flow distortion in the inlet, step 1608. For the various disclosed implementations, the step of modulating the flow control devices may be accomplished by selectively aligning concentric cylinders with aperture arrays to connect corresponding subarrays of the flow control devices to a pressure source, selectively opening valves between a pressure source and the one or more of the plurality flow control devices to form the subarrays, selectively opening valves between a pressure source and one or more manifolds connected to subarrays of the plurality of flow control devices, selectively activating synthetic devices to form the subarrays, or selectively deploying and stowing deployable vortex generators to form the subarrays.

Having now described various implementations in detail as required by the patent statutes, those skilled in the art will recognize modifications and substitutions to the specific implementations disclosed herein. Such modifications are within the scope and intent of the following claims. Within the specification and the claims, the terms "comprising", "incorporate", "incorporates" or "incorporating", "include", "includes" or "including", "has", "have" or "having", and "contain", "contains" or "containing" are intended to be open recitations and additional or equivalent elements may be present. The term "substantially" as used within the specification and claims means that the recited characteristic, parameter, or value need not be achieved exactly, but that deviations or variations, including for example, tolerances, measurement error, measurement accuracy limitations and other factors known to those skilled in the art, may occur in amounts that do not preclude the effect the characteristic was intended to provide. As used herein the terms "right", "left", "forward" and "aft", "upper" and "lower", and "clockwise" and "counter-clockwise" are employed to describe relative positioning and motion with respect to the drawings and example implementations and other than for the specific implementations disclosed may be substituted or reversed with appropriate descriptors such as "first" and "second", "top" and "bottom" or "left" and "right" depending on orientation of actual implementation.

What is claimed is:

1. An inlet flow distortion control system comprising:
a plurality of flow control devices integrated into an internal surface of the inlet forming a right array having an azimuthal range relative to a normal flow axis of the inlet and determined based on a flow separation domain for a right crosswind, and a left array having an azimuthal range relative to a normal flow axis of the inlet and determined based on a flow separation domain for a left crosswind, each of the right array and left array having a plurality of circumferential rows spaced at an increasing axial distance from a highlight of the inlet,
wherein for each of the right array and left array, a first row of the plurality of circumferential rows includes flow control devices extending over the azimuthal range of said each of the right array and left array, a second row of the plurality of circumferential rows includes flow control devices extending over a reduced azimuthal range of said each of the right array and left array and a third row of the plurality of circumferential rows includes flow control devices extending over a further reduced azimuthal range of said each of the right array and left array; and,
a control system operably connected to the plurality of flow control devices, said control system adapted to activate flow control devices in selected subarrays of the right array or left array responsive to an inlet flow state indicated by a predetermined flight condition or measured flow parameters within the inlet.

2. The inlet flow distortion control system of claim 1, wherein the control system comprises:
a controller receiving a status signal or a condition input for crosswind or angle of attack;
a mass flow input to the controller; and
one or more activation devices receiving an output signal from the controller responsive to the mass flow input and the status signal or the condition input, said one or more activation devices configured to activate flow control devices in one of the selected subarrays.

3. The inlet flow distortion control system of claim 2, wherein the one or more activation devices comprise:
one or more concentric cylinders spaced between the internal surface of the inlet and a pressure plenum, the one or more concentric cylinders having aperture arrays rotatable from a closed position into alignment with one or more control jet rows; and,
a pressure source connected to the pressure plenum.

4. The inlet flow distortion control system of claim 3, wherein the pressure source is a bleed air system.

5. The inlet flow distortion control system of claim 3, wherein the one or more concentric cylinders comprise a plurality of concentric cylinders, each concentric cylinder aligned with a respective one of the one or more control jet rows to open the one of the selected subarrays to the pressure plenum.

6. The inlet flow distortion control system of claim 2, wherein the one or more activation devices comprise one or more valves, each valve connecting corresponding ones of the plurality of flow control devices.

7. The inlet flow distortion control system of claim 6, further comprising at least one manifold connecting one of said one or more valves to a selected subarray of the right array or left array of the plurality of flow control devices.

8. The inlet flow distortion control system of claim 2, wherein the plurality of flow control devices each comprise a synthetic jet and further comprising:
   a power connection to each synthetic jet; and,
   a level control connected through a relay to each synthetic jet, controllable to produce selected subarrays of the right array or left array.

9. The inlet flow distortion control system of claim 2, wherein the plurality of flow control devices each comprise a deployable vortex generator, and wherein the one or more activation devices each comprise solenoid operators.

10. A jet engine, comprising:
   an inlet having a normal flow axis and an internal surface extending from a highlight;
   a plurality of flow control devices forming at least one array integrated into the internal surface, said at least one array extending over an azimuthal range relative to the normal flow axis and having a plurality of circumferential rows spaced at an increasing axial distance from the highlight of the inlet wherein a first of the plurality of circumferential rows includes flow control devices extending over the azimuthal range of said at least one array, a second of the plurality of circumferential rows includes flow control devices extending over a reduced azimuthal range of said at least one array and a third of the plurality of circumferential rows includes flow control devices extending over a further reduced azimuthal range of said at least one array; and,
   a control system operably connected to the plurality of flow control devices, said control system adapted to activate the flow control devices in selected subarrays of the at least one array responsive to a predetermined flight condition or an inlet flow field.

11. The inlet flow distortion control system of claim 10, wherein the control system comprises:
   a controller receiving a status signal or a condition input for crosswind or angle of attack;
   a mass flow input to the controller; and
   one or more activation devices receiving an output signal from the controller responsive to the mass flow input and the status signal or the condition input, said one or more activation devices configured to activate flow control devices in one of the selected subarrays.

12. The inlet flow distortion control system of claim 11, wherein the one or more activation devices comprise:
   a plurality of concentric cylinders spaced between the internal surface of the inlet and a pressure plenum, each concentric cylinder aligned with a respective one of the one or more control jet rows to open the one of the selected subarrays to the pressure plenum; and,
   a pressure source connected to the pressure plenum.

13. The inlet flow distortion control system of claim 10, wherein the one or more activation devices comprise one or more valves, each valve connecting corresponding ones of the plurality of flow control devices.

14. The inlet flow distortion control system of claim 10, wherein the plurality of flow control devices each comprise a synthetic jet and further comprising:
   a power connection to each synthetic jet; and,
   a level control connected through a relay to each synthetic jet, controllable to produce selected subarrays of the at least one array.

15. A method for flow control in a jet inlet, the method comprising:
   receiving a status signal and a mass flow signal in a controller;
   providing a control output from the controller responsive to the status signal and the mass flow signal to one or more of a plurality of flow control devices in at least one array on an inlet internal surface, said at least one array extending over an azimuthal range relative to the normal flow axis and having a plurality of circumferential rows spaced at an increasing axial distance from the highlight of the inlet wherein a first of the plurality of circumferential rows includes flow control devices extending over the azimuthal range of said at least one array, a second of the plurality of circumferential rows includes flow control devices extending over a reduced azimuthal range of said at least one array and a third of the plurality of circumferential rows includes flow control devices extending over a further reduced azimuthal range of said at least one array; and
   reducing flow distortion in the inlet.

16. The method of claim 15, further comprising:
   receiving a condition signal in the controller from one or more condition sensors; wherein the step of reducing flow distortion comprises
   modulating the plurality of flow control devices to form subarrays responsive to the mass flow signal or condition signal for optimizing reduction of flow distortion in the inlet.

17. The method of claim 16, wherein the step of modulating the plurality of flow control devices comprises selectively aligning concentric cylinders with aperture arrays to connect corresponding subarrays of the plurality of flow control devices to a pressure source.

18. The method of claim 16, wherein the step of modulating the plurality of flow control devices comprises:
   selectively opening valves between a pressure source and one or more of the plurality of flow control devices to form the subarrays, or
   one or more manifolds connected to the subarrays of the plurality of flow control devices.

19. The method of claim 16, wherein the plurality of flow control devices comprise synthetic jet devices, and the step of modulating the plurality of flow control devices comprises selectively activating the synthetic devices to form the subarrays.

20. The method of claim 16, wherein the plurality of flow control devices comprise deployable vortex generators, and the step of modulating the plurality of flow control devices comprises selectively deploying and stowing the deployable vortex generators to form the subarrays.

* * * * *